(12) United States Patent
Dincan et al.

(10) Patent No.: US 10,992,233 B2
(45) Date of Patent: Apr. 27, 2021

(54) SUB-RESONANT MODE DUAL CONTROL OF DC-DC CONVERTER WITH SECONDARY-SIDE RESONANT TANK

(71) Applicant: VESTAS WIND SYSTEMS A/S, Aarhus N (DK)

(72) Inventors: Catalin Gabriel Dincan, Aalborg Øst (DK); Philip Carne Kjær, Aarhus C (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/478,916

(22) PCT Filed: Jan. 29, 2018

(86) PCT No.: PCT/DK2018/050016
§ 371 (c)(1),
(2) Date: Jul. 18, 2019

(87) PCT Pub. No.: WO2018/141342
PCT Pub. Date: Aug. 9, 2018

(65) Prior Publication Data
US 2019/0386571 A1    Dec. 19, 2019

(30) Foreign Application Priority Data
Jan. 31, 2017    (DK) .............................. PA201770059

(51) Int. Cl.
*H02M 3/335* (2006.01)
*H02M 1/00* (2006.01)
*H02M 1/08* (2006.01)

(52) U.S. Cl.
CPC ......... *H02M 3/33569* (2013.01); *H02M 1/08* (2013.01); *H02M 2001/0054* (2013.01)

(58) Field of Classification Search
CPC .......... H02M 3/3353; H02M 3/33569; H02M 3/33553; H02M 3/33523; H02M 3/335; H02M 3/33507; H02M 2001/0058
See application file for complete search history.

(56) References Cited

U.S. PATENT DOCUMENTS 4,587,606 A    5/1986   Sanada
4,692,851 A    9/1987   Attwood
(Continued)

FOREIGN PATENT DOCUMENTS

CA    2079554 A1    4/1993
EP    2495859 A2    9/2012
(Continued)

OTHER PUBLICATIONS

Danish Patent and Trademark Office 1st Technical Examination for Patent Application No. PA 2017 70059 dated Jul. 27, 2017.
(Continued)

*Primary Examiner* — Gustavo A Rosario-Benitez
(74) *Attorney, Agent, or Firm* — Patterson + Sheridan, LLP

(57) ABSTRACT

A DC to DC power converter is described that includes a transformer, a primary side connected to a primary transformer winding, and a secondary side connected to a secondary transformer winding. The secondary side comprises inductor-capacitor (LC) circuitry at an input, and a plurality of diodes providing uncontrolled rectification. A controller controls switching of the switching circuitry to apply voltage pulses to the primary transformer winding. The voltage pulses are separated by zero-voltage periods. A switching frequency of the switching circuitry is less than the resonant frequency of the LC circuitry.

18 Claims, 24 Drawing Sheets

(56) References Cited

U.S. PATENT DOCUMENTS

| | | | |
|---|---|---|---|
| 5,539,630 A | 7/1996 | Pietkiewicz et al. | |
| 6,538,910 B1 | 3/2003 | Spitz et al. | |
| 6,744,649 B1 | 6/2004 | Yang et al. | |
| 2002/0044461 A1* | 4/2002 | Jang | H02M 3/33569 363/17 |
| 2009/0108767 A1* | 4/2009 | Kohno | H02M 3/285 315/291 |
| 2011/0222651 A1* | 9/2011 | Ogawa | H02M 7/53871 378/20 |
| 2013/0033240 A1* | 2/2013 | Ye | H02M 1/4225 323/211 |
| 2013/0265804 A1 | 10/2013 | Fu et al. | |
| 2014/0098578 A1* | 4/2014 | Halberstadt | H02M 3/33592 363/21.15 |
| 2014/0225439 A1* | 8/2014 | Mao | H02J 50/80 307/31 |
| 2015/0180356 A1* | 6/2015 | Norisada | H02M 3/3353 363/17 |
| 2016/0001665 A1* | 1/2016 | Kim | B60L 11/1809 320/109 |
| 2016/0049858 A1* | 2/2016 | Kim | H02M 3/3376 363/17 |
| 2018/0175736 A1* | 6/2018 | Ishigaki | H02M 3/33584 |

FOREIGN PATENT DOCUMENTS

| | | |
|---|---|---|
| EP | 2720365 A2 | 4/2014 |
| GB | 881869 A | 11/1961 |
| GB | 2484971 A | 5/2012 |
| KR | 101000561 B1 | 12/2010 |
| WO | 2018141342 A1 | 8/2018 |

OTHER PUBLICATIONS

PCT International Search Report for Application No. PCT/DK2018/050016 dated Sep. 4, 2018.

PCT Written Opinion of the International Searching Authority for Application No. PCT/DK2018/050016 dated Sep. 4, 2018.

* cited by examiner

| Mode of operation | Range of switching frequency | Voltage difference Vg'-Vo |
|---|---|---|
| DCM1 | 0-$F_s$ | Vg'-Vo = 0 |
| DCM2 | 0-$F_s$/2 | Vg'-Vo > 0 |
| CCM1-hybrid | $F_s$/2 - $F_s$ | Vg'-Vo = 0 |
| CCM1 | $F_s$/2 - $F_s$ | Vg'-Vo > 0 |
| Table 1 Applicable modes of operation | | |

Figure 17

SUB-RESONANT MODE DUAL CONTROL OF DC-DC CONVERTER WITH SECONDARY-SIDE RESONANT TANK

FIELD OF THE INVENTION

The present invention relates to a DC-DC converter and a corresponding method of operation. Embodiments of the present invention are directed to a DC-DC converter for converting a low voltage direct current (LVDC) output of a wind turbine generator apparatus or other power source into a medium voltage direct current (MVDC) output. Other embodiments could convert a medium voltage to a high voltage, or a medium voltage to a low voltage. Some embodiments of the present invention are particularly applicable to megawatt medium voltage DC wind turbines and large photovoltaic plants with DC output.

BACKGROUND TO THE INVENTION

Wind turbines generate electrical power by converting the rotation of turbine blades, driven by wind, into an electrical signal, which can then be pushed onto an electricity grid. This can be considered in three stages. In the first stage, the wind drives rotation of the turbine blades. In the second stage, the rotation of the turbine blades is turned into electrical energy by a generator. In the third stage, the electrical energy is converted into a suitable form and pushed onto the grid. It will be appreciated that the overall efficiency of energy generation is a function of the efficiency of each of the three stages. The present invention is concerned with the third stage, that of efficiently converting the electrical energy output from the generator into a form suitable for injection to the grid at reduced cost of installation.

It is against this background that the invention has been devised.

SUMMARY OF THE INVENTION

In a first aspect, the invention provides a DC to DC power converter comprising a transformer, a primary side connected to a primary winding of the transformer, a secondary side connected to a secondary winding of the transformer, and a controller, an input of the secondary side comprising inductor-capacitor (LC) circuitry, the primary side comprising switching circuitry, the controller being arranged to control switching of the switching circuitry to apply voltage pulses to the primary winding of the transformer, the voltage pulses being separated by zero voltage periods during which a zero or near zero voltage is applied to the transformer, and a frequency of the switching of the switching circuitry being lower than the resonant frequency of the LC circuitry.

Preferably, the switching circuitry comprises first switching circuitry and second switching circuitry, the controller being arranged to control switching of the first and second switching circuitry, wherein the controller controls the switching of the first switching circuitry and the second switching circuitry such that switching of the first switching circuitry is phase displaced with switching of the second switching circuitry.

With this arrangement, operating in a sub-resonant mode permits a full resonant cycle of the LC circuit current to pass within a single switching cycle of the first and second switching circuitry, allowing zero current switching of primary side switching circuitry and secondary side diodes, while the output power effectively becomes a function of switching frequency (which varies the number per second of resonant pulses at the LC circuitry, each pulse transferring an amount of power determined completely by input and output voltages and switching frequency and phase shift). The phase shift between the first and second switching circuitry removes the voltage pulse which would otherwise be generated by the switching circuitry when it is not required to transfer energy from primary side to secondary side, thereby avoiding or at least reducing a flux build up at the transformer (to which the voltage pulse is applied). The result allows design of an efficient and low-cost series resonant converter for operation in a wide operating range.

Preferably, the phase shift between the switching of the first switching circuitry and the second switching circuitry has substantially the same period as the resonant frequency of the LC circuitry.

Preferably, the controller is operable to control a voltage applied to the LC circuitry by modifying the switching frequency of the switching circuitry. More particularly, the controller keeps the phase shift constant while modifying the switching frequency of the first and second switching circuitry.

Preferably, a voltage is applied to the transformer by the switching circuitry for substantially the same duration as a resonant current pulse formed at the LC circuitry in response to the applied voltage. Preferably, upon the resonant current through the LC circuitry reaching zero, the voltage output of the switching circuitry is switched to (or near to) zero.

Preferably, the controller is operable to introduce zero voltage periods into the combined output of first and second switching circuitry.

Preferably, each of the first and second switching circuitry comprises two switches in a voltage source converter, two-level, phase leg configuration, only one of the two switches being closed at any given time, an output voltage of a first polarity being output by the first and second switching circuitry when a first switch of the first switching circuitry and a second switch of the second switching circuitry, together forming a switching pair, are closed, and an output voltage of a second polarity being output by the first and second switching circuitry when a second switch of the first switching circuitry and a first switch of the second switching circuitry, together forming a switching pair, are closed, the zero voltage periods being provided at the output either by the first switch of the first and secondary circuitry or by the second switch of the first and second circuitry.

Preferably, as the switching frequency increases, the length of the zero voltage periods is reduced.

Preferably, the duration of a voltage pulse output by the switching circuitry is independent of output power.

In a second aspect, the invention provides a DC to DC power conversion method of converting a voltage at a primary side connected to a primary winding of a transformer of a power converter into a voltage at a secondary side connected to a secondary winding of the transformer of the power converter, an input of the secondary side comprising LC circuitry and the primary side comprising switching circuitry, the method comprising controlling the switching of the switching circuitry to apply voltage pulses to the primary winding of the transformer, the voltage pulses being separated by zero voltage periods during which a zero or near zero voltage is applied to the transformer, and a frequency of the switching of the switching circuitry is lower than the resonant frequency of the LC circuitry.

A computer program for controlling the switching of a DC to DC power converter is also envisaged as part of the present invention.

The present technique relates to the connection of a LVDC (low voltage direct current) power source to a MVDC (medium voltage direct current) collection grid. It proposes a resonant converter, where the resonant tank is provided on the secondary or MV side of the transformer and a new control method is used to drive the application of voltage pulses to a transformer separating the two sides.

The present technique is able to provide conversion of low voltage to medium voltage direct current. Megawatt levels of power can be delivered at high efficiency (indicatively 99%). Galvanic separation is provided. High power density allows a smaller transformer rating for the same power level and operating range. Other advantages include substantially no transformer saturation (due to no voltage pulse being applied to the transformer during the zero voltage periods), and the consequential low power requirement for cooling of semiconductors.

The present technique may be particularly useful with (but is not limited to) offshore wind farms and large photovoltaic plants.

In the context of a DC-DC power converter, positioning the resonant tank on the secondary side of the transformer would not normally be considered, since this requires higher clearance and creepage distance, and increases final volume. Moreover, the equivalent series resistance (ESR) increases with the number of series connected inductors and capacitors. The present technique could also be expected to increase the risk of transformer saturation due to unsymmetrical volt-seconds. However, in practice, the combination of a resonant tank on the secondary side with the particular frequency and phase shift switching control method has been found to be highly advantageous.

BRIEF DESCRIPTION OF THE DRAWINGS

FIG. 17 is a table (Table 1) indicating the conditions under which the various modes of operation can be expected to apply, where Vg' is primary voltage reflected across the transformer;

DETAILED DESCRIPTION OF EMBODIMENTS OF THE INVENTION

Figure 1:
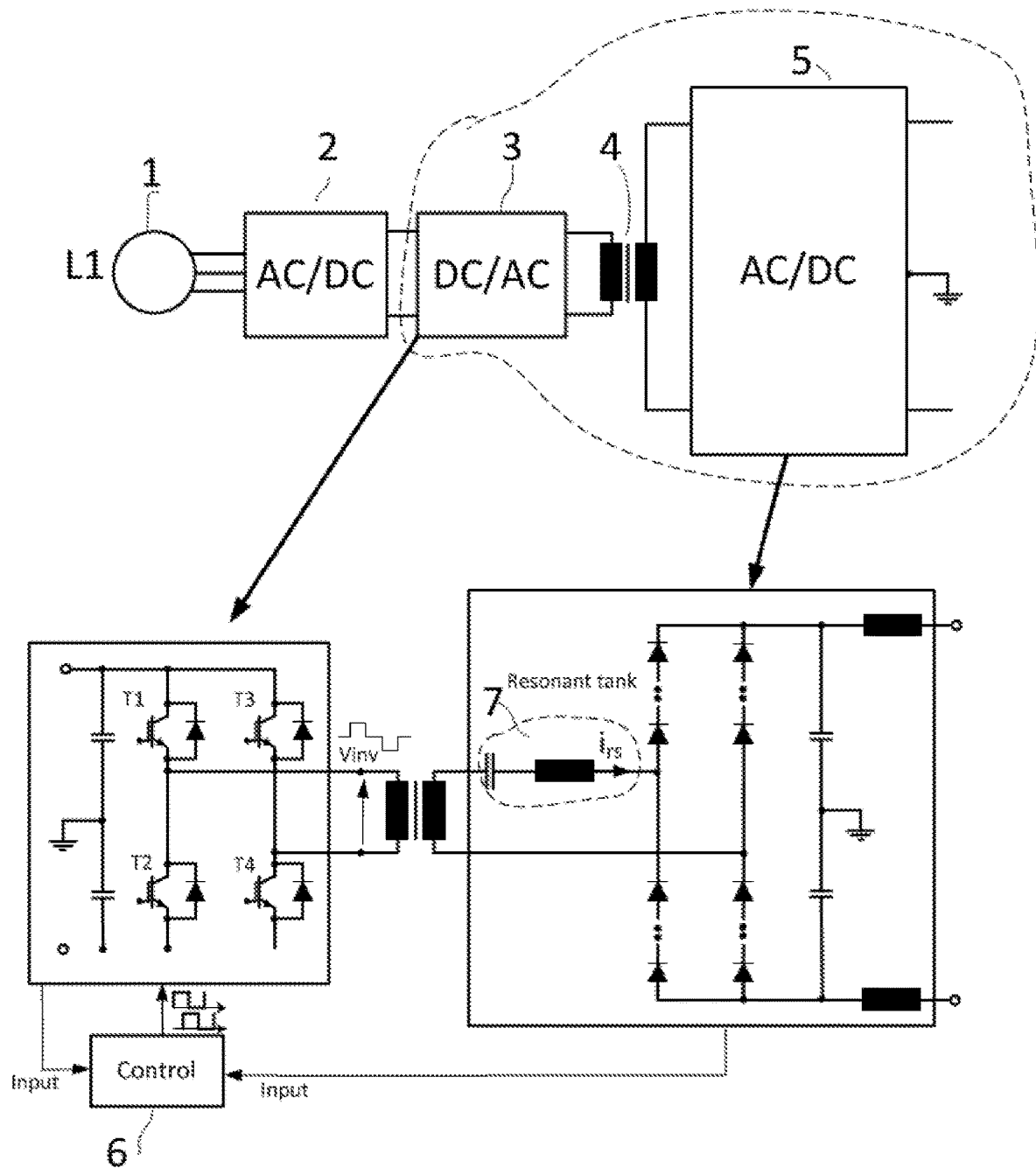
FIG. 1 is a schematic view of an embodiment of the invention.

Considering an application like offshore wind turbines, a suitable power converter circuit is shown in FIG. 1. The converter comprises a PMSM (permanent magnet synchronous machine) generator 1 and an active rectifier 2 which converts the AC output of the wind turbine into a DC voltage. The resulting DC voltage output from the rectifier 2 is provided to a full bridge inverter (DC/AC converter) 3 which is coupled to an AC/DC converter 5 via a monolithic transformer 4 with a single secondary winding. The AC/DC converter is composed of a series resonant tank (LC circuitry) 7, rectifier and output filter. Blocks 3 and 5 are shown in more detail at the bottom of FIG. 1, and a controller 6 which operates in accordance with a new control method is also shown at the bottom of FIG. 1. The controller 6 drives the DC/AC converter 3, and in particular controls the transistor switches T1, T2, T3 and T4 of the DC/AC converter 3 using a pulse width modulation (PWM) signal. PWM is used to generate a square wave voltage with a 50% duty cycle, by comparing a carrier signal (with variable frequency) with a DC signal. The controller receives as inputs a signal from the AC/DC converter 5 indicating the output voltage Vo and rectified current [Ir], and an input from the DC/AC converter 3 indicating the input voltage Vg and input dc current. Based on the received signals, the controller 6 decides on a suitable switching frequency (and phase shift?) for the transistor switches T1, T2, T3 and T4. More particularly, a feedforward and PI controller may be used to determine the switching frequency based on the measured inputs in accordance with Freq=Nt*Power/(16*Vg*Vo*Cres), where Nt is the transformer turns ratio and Cres is the capacitance of the resonant capacitor of the LC circuitry. The DC/AC converter 3 can be considered a primary side, while the AC/DC converter 5 can be considered a secondary side. It can be seen from the exploded view of the AC/DC converter 5 that a resonant tank 7, comprising a capacitor and inductor in series, is located on the secondary side. It should be understood that the generator 1 and the rectifier 2 are state of the art solutions. The invention is formed principally by the control method utilised by the controller 6 in combination with the placement of the resonant tank 7 on the secondary side.

The present technique is able to deliver megawatt levels of power at an efficiency above 99%, while decreasing the size of transformer by moving the resonant tank to the secondary side and applying a modified square wave voltage (Vinv) to the transformer.

Figure 7:
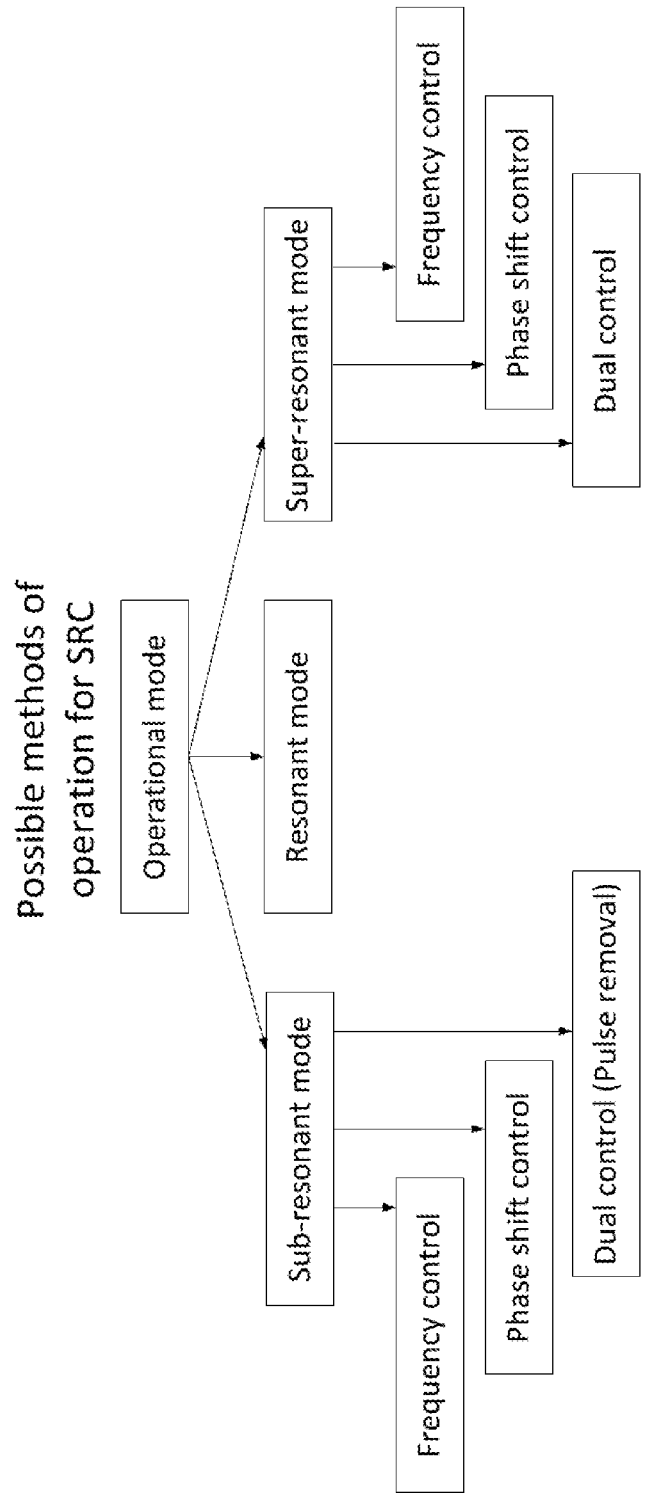
FIG. 7 schematically identifies possible methods of operation of a series resonant converter.

For a series resonant converter, power can be controlled in three different methods, as seen in FIG. 7. These methods are sub-resonant mode (switching frequency below the resonant frequency of the LC circuitry), resonant mode (switching frequency at the resonant frequency of the LC circuitry) and super-resonant mode (switching frequency above the resonant frequency of the LC circuitry). For sub resonant and super resonant mode, three modes of operation are possible. These are frequency control, phase shift control and dual control (frequency and phase shift). In resonant mode, only constant frequency and no phase shift are used.

Figure 2:
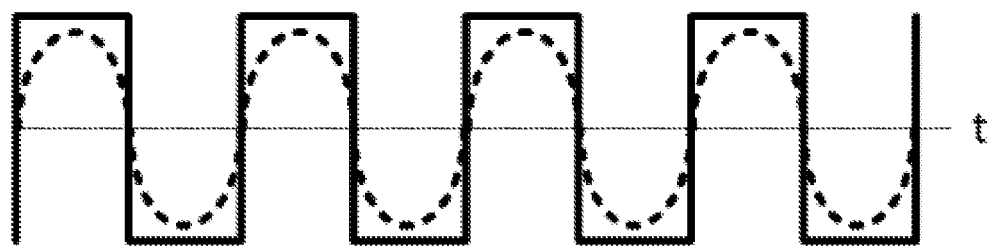
FIG. 2 is a schematic drawing of a voltage applied to the transformer of FIG. 1 for different frequencies.
Figure 2:
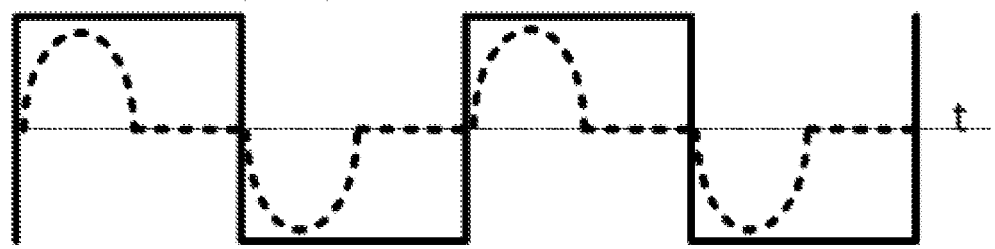
Figure 2:
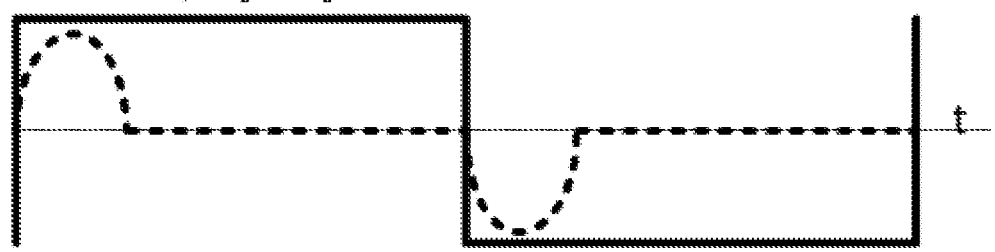

By using frequency control in a sub-resonant mode, the applied primary voltage is modified as seen in FIG. 2. In FIG. 2 (top), the length of a voltage pulse Vinv (indicated by a solid line waveform) applied to the transformer is substantially equal to the duration of a current pulse at the LC circuitry when operating at X kHz. In particular, it will be appreciated that when a voltage is applied to a resonant tank (LC circuitry), the current through the tank varies over time, increasing and then decreasing as shown in FIG. 2 (current Iinv, indicated by a dashed line waveform). In FIG. 2 (top) the polarity of the voltage applied to the transformer is reversed when the current through the resonant tank has dropped to zero. This avoids, or at least minimises, switching losses. In FIG. 2 (middle), which shows the voltage Vinv being switched at a frequency of X/2 kHz, it can be seen that the duration of the current pulse does not vary with voltage switching frequency. Accordingly, there is a zero current period which increases with duration as the switching frequency is reduced (FIG. 2 middle and bottom, with half (X/2) and quarter (X/4) frequency voltage switching respectively). It will therefore be understood that, when in a sub-resonant mode, losses on the semiconductor are decreased, since switching can take place during a zero current period of the LC circuitry. However, designing the transformer for variable frequency means that the lowest operating frequency needs to be considered, otherwise the transformer will saturate, leading to overheating and short circuit issues. So, decreasing the size of the transformer is not possible with this control method (variable frequency) and in this mode of operation (sub-resonant mode).

Figure 3:
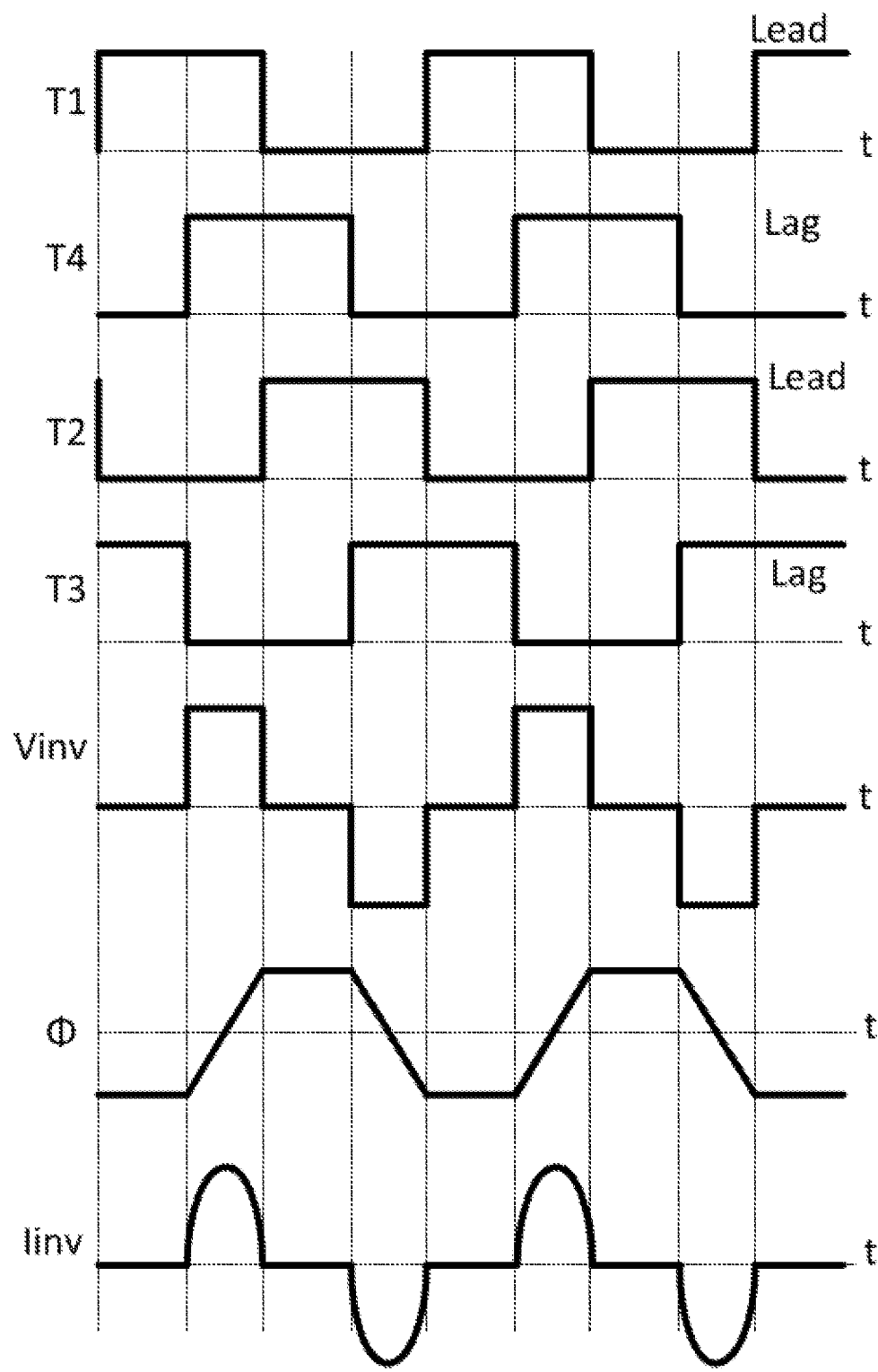
FIG. 3 is a schematic drawing of a phase shift applied to the primary switching circuitry of FIG. 1 in a sub-resonant mode.

In contrast, the present technique proposes a method where the transformer will not saturate, even if using variable frequency to control the power output. To achieve this, and referring again to FIG. 1, a constant phase shift is introduced between the pulses applied to switches T1-T4 and T2-T3. The switches T1 and T2 form first switching circuitry. The switches T3 and T4 form second switching circuitry. Only one of the two switches in each of the first and second switching circuitry is closed at any given time. An output voltage of a first polarity is output by the first and second switching circuitry when a first switch T1 of the first switching circuitry and a second switch T4 of the second switching circuitry, together forming a switching pair, are closed, and an output voltage of a second polarity is output by the first and second switching circuitry when a second switch T2 of the first switching circuitry and a first switch T3 of the second switching circuitry, together forming a switching pair, are closed. In a non-phase shifted mode, when the switches T1 and T4 are closeds, the switches T2 and T3 are open, and when the switches T2 and T3 are closed, the switches T1 and T4 are open. In contrast, in a phase shifted mode, zero voltage periods are provided (when (substantially) no voltage, of either the first or second polarity are output) by having one switch of a switching pair open while the other is closed. FIG. 3 shows the phase shift between the first switching circuitry (T1 and T2) and the second switching circuitry (T3 and T4). As is conventional, the switches T1 and T2 are in opposite phases to each other (that is, the switch T1 is open while the switch T2 is closed, and vice versa), as are the switches T3 and T4. However, the switches T1 and T4 are phase displaced with each other, and the switches T2 and T3 are phase displaced with each other. As can be seen in FIG. 3, the switch T4 is controlled to close (become active) at a later time than the switch T1, and the switch T3 is controlled to close (become active) at a later time than the switch T2. The resulting output voltage waveform Vinv is shown in FIG. 3. In particular, when both switches T1 and T4 are closed, a voltage pulse of a first polarity is generated in the voltage waveform Vinv. When both switches T2 and T3 are closed, a voltage pulse of a second polarity is generated in the voltage waveform Vinv. Otherwise, when only one of the switches T1 and T4, or one of the switches T2 and T3, are closed, a zero (or near zero) voltage output is generated in the voltage waveform Vinv. More specifically, a positive combined output of the first and second switching circuitry arises when the switches T1 and T4 are both closed, while a negative output arises when the switches T2 and T3 are both closed. Otherwise, a zero, or near zero, voltage output occurs. The voltage waveform Vinv, applied to the resonant tank 7 via the transformer 4, results in a current waveform Iinv being generated at the output of the resonant tank. This is shown at the bottom of FIG. 3. Also shown in FIG. 3 is the build up of magnetic flux 4) at the transformer 4 as a result of the applied voltage waveform Vinv. As can be seen, while a positive voltage is applied, the magnetic flux builds up in a first direction, and while a negative voltage is applied, the magnetic flux builds up in a second direction. While a zero voltage is applied, there is no further build up of magnetic flux, which is highly desirable.

Figure 4:
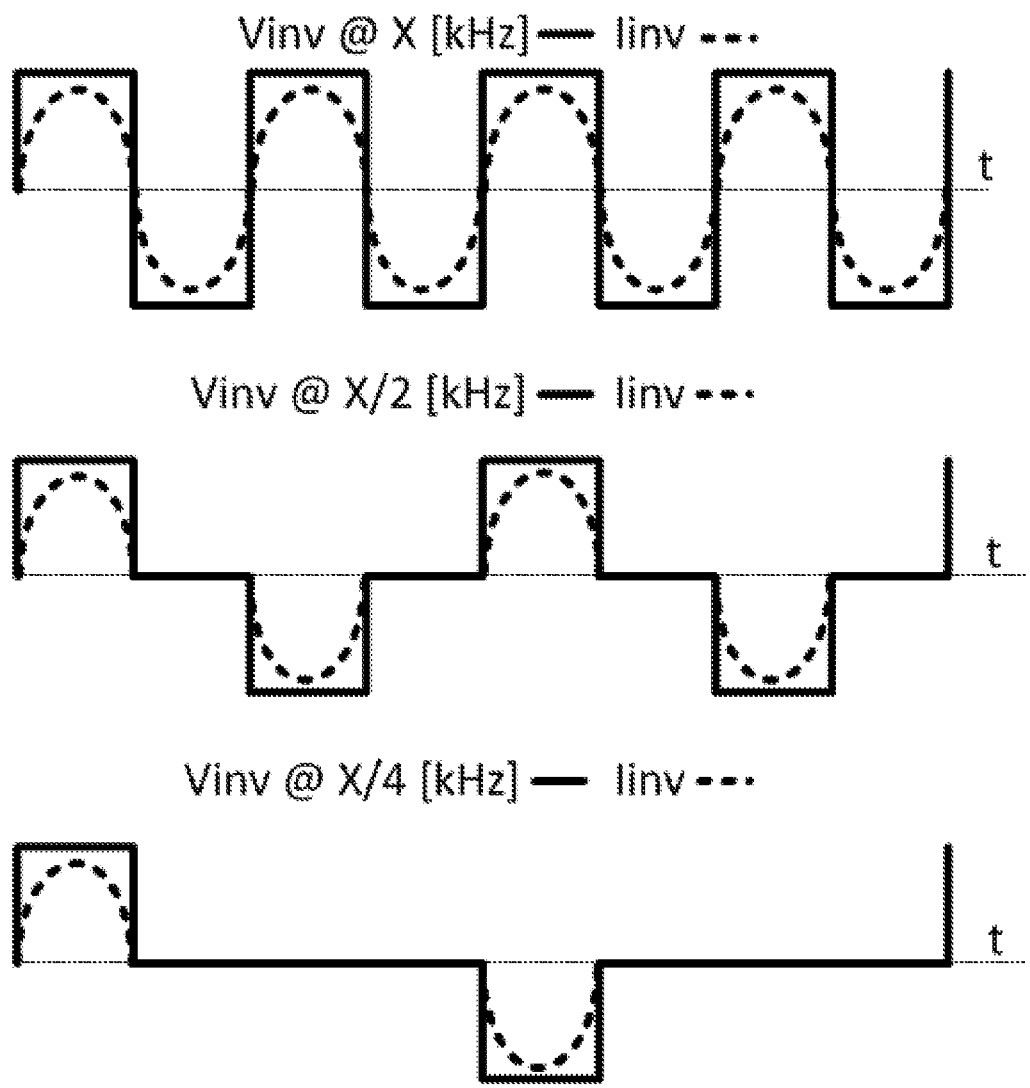
FIG. 4 is a schematic drawing of a voltage applied to the transformer of FIG. 1 at a variable frequency and with the phase shift of FIG. 3 applied.

Referring to FIG. 4, the use of different switching frequencies with a fixed length voltage pulse is shown. In FIG. 4 (top), the switching frequency of the voltage Vinv (solid line) is substantially equal to the resonant frequency of the resonant tank (current Iinv (dashed line), and so there are no zero voltage periods. However, as the switching frequency is reduced (FIG. 4 middle (frequency X/2) and bottom (frequency X/4)), longer zero voltage periods are included in the voltage waveform Vinv. However, the "overlap" length during which the two switches in each pair are both closed, which give rise to the voltage pulse, remains the same—since the resonant current pulse length of the LC circuitry in a sub-resonant mode is the same regardless of switching frequency. It will therefore be understood that the phase shift has the same period as the resonant frequency of the resonant tank.

It will therefore be appreciated that moving the resonant tank on the secondary side of the transformer and applying a dual (frequency and phase shift) control method in a sub resonant mode can increase efficiency and decrease the size of the transformer.

This more detailed description provided below explains a method of operation for a DC-to-DC converter, which transfers power from an LVDC (low voltage direct current) network to an MVDC (medium voltage direct current) network. The converter includes two bridge arrangements (inverter and rectifier), a medium frequency transformer, a resonant tank and output capacitive filter. It will be understood that the new method of operation for a DC-to-DC converter employs a series resonant converter (SRC). Some intended applications are for megawatt high-voltage DC wind turbines and large photovoltaic plants with DC output. The converter is unidirectional—that is, controlling and transferring power only in the direction from an LVDC network towards an MVDC network. Compared to a classic frequency controlled series resonant converter, the new method (referred to as a pulse removal technique due to the removal of a voltage pulse from the voltage signal applied to the transformer) promises higher efficiency and reduced transformer size. The new method operates with variable frequency and a phase shift and has 4 different types of conduction mode, as will be explained further below.

Figure 6:
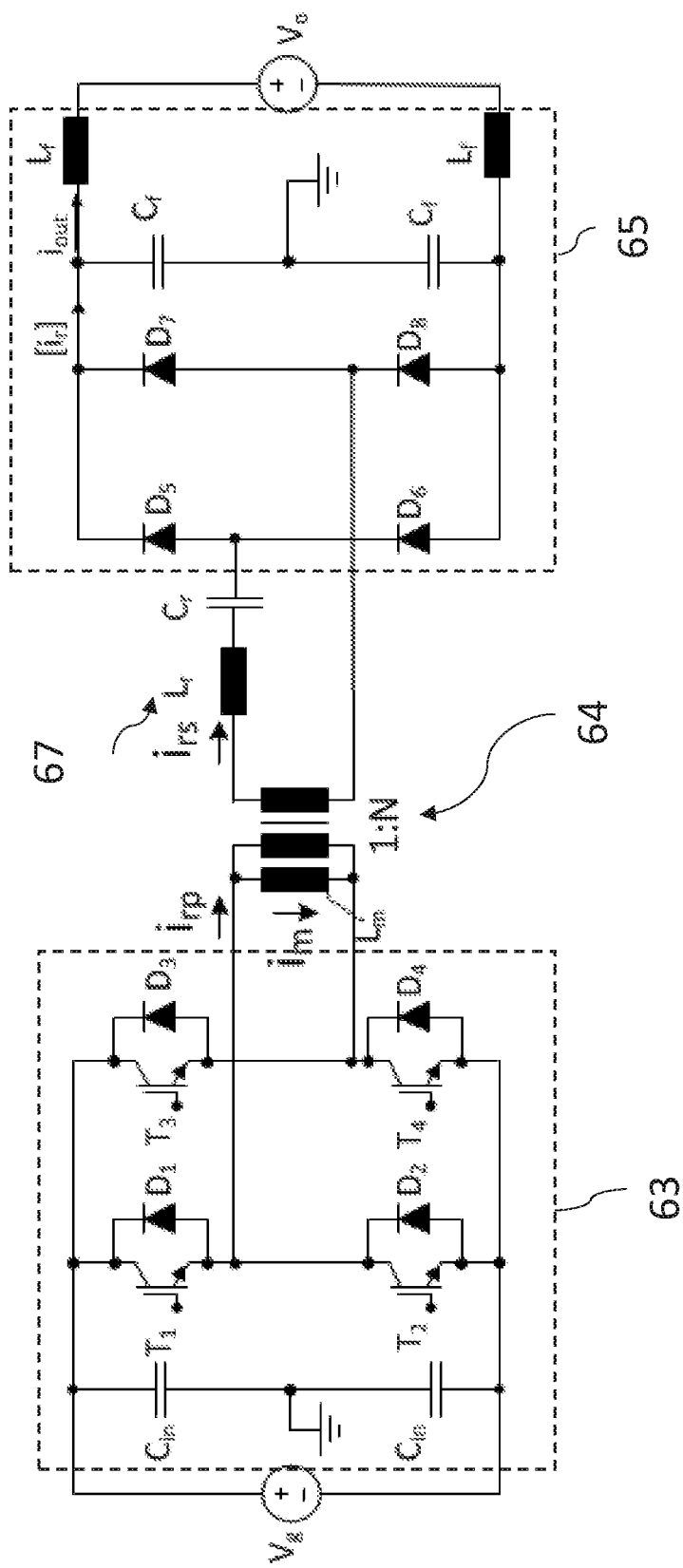
FIG. 6 is a schematic view of the modified series resonant converter of an embodiment of the invention.

MVDC grids are thought to be the best technical candidate for integration of renewable resources. Compared with MVAC grids, they offer higher efficiency and reliability, a lower bill of materials and increased power transfer capability. There are no issues with synchronization stability, active power can be controlled rapidly and independently and there is enhanced fault ride through capability. For example, offshore wind farms with MVDC collection promise an increase in efficiency and a reduced bill of materials. A candidate solution for the wind turbine circuit is shown in FIG. 6. Another application is the connection of large photovoltaic plants to MVDC networks. An important component in both applications is the DC/DC converter, which is a unidirectional DC/DC series resonant converter composed of a low voltage inverter, one monolithic transformer (with one primary and one secondary winding), a medium voltage resonant tank and rectifier built with series connected diodes.

High availability, efficiency and power density are design targets for the DC/DC converter. Today, MV and MW converters usually apply hard switching on IGBTs (insulated-gate bipolar transistors) or IGCTs (integrated gate-commutated thyristors), while being connected to a low frequency transformer. In order to decrease the size and weight of the transformer, while keeping high efficiency, it is advantageous to use resonant converters and soft-switching techniques. In other DC/DC conversion applications a widespread topology that allows soft-switching operation and high efficiency is the series resonant converter (SRC). The topology has been studied mainly in low power, high frequency and high voltage applications, but recently has gained popularity in traction and solid state transformers. Operated in sub-resonant mode it is known as a half cycle discontinuous-conduction-mode series-resonant converter, or HC-DCM-SRC. For those applications, the converter couples two DC voltages with a fixed voltage transfer ratio, but has no control possibilities. On the other hand, for a wind turbine and PV plant, the DC/DC converter must have the functionality of controlling the transferred power in the presence of varying input and output DC-link voltages, while offering galvanic separation and a high voltage gain. The present technique introduces a new method of operation for the series resonant converter, where frequency and phase shift in sub-resonant mode are applied. The benefits of the method compared to a series resonant converter operated only with frequency control in sub-resonant mode are low and close-to-constant losses versus load and a 50% reduction in size of the transformer.

Figure 5:
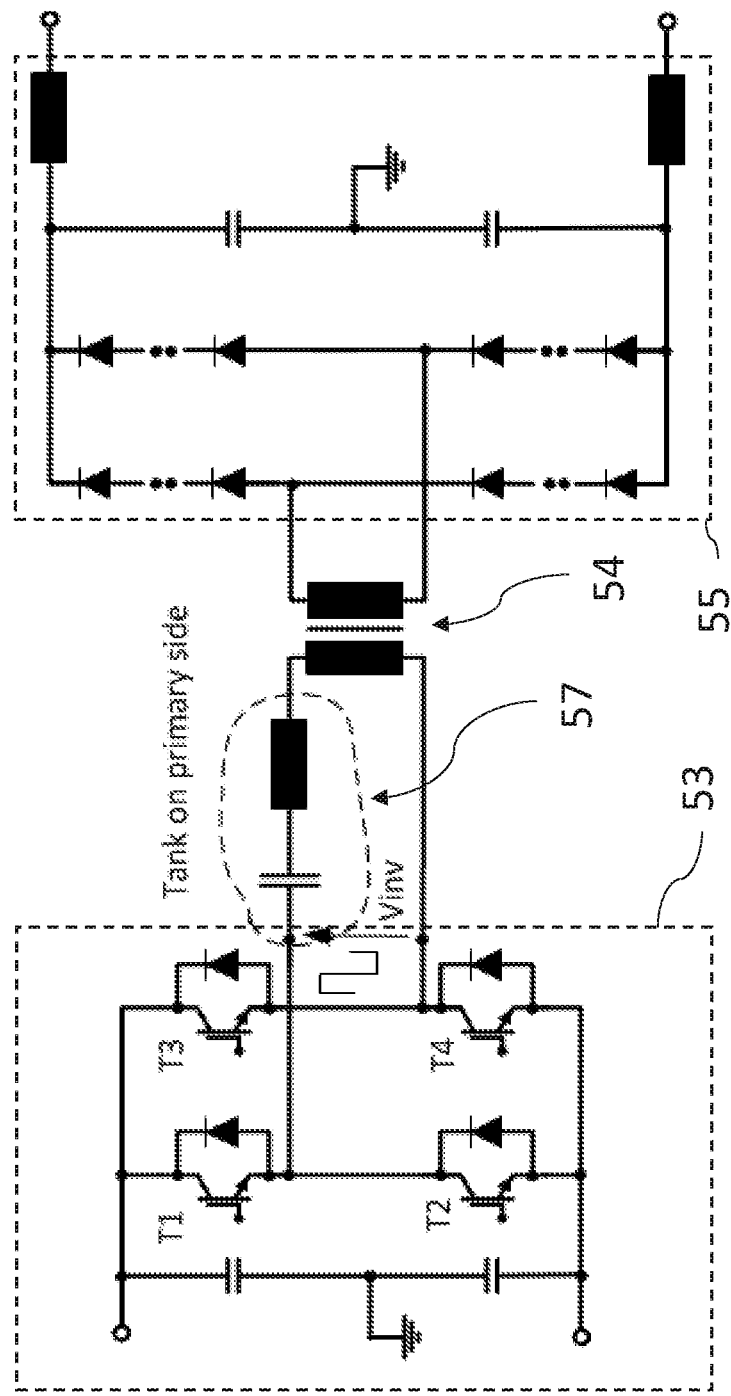
FIG. 5 shows a prior art circuit with the resonant tank on the primary side.

In order to understand the advantages of the new method of operation for the series resonant converter with a resonant tank on secondary side, it's necessary to discuss first the classic series resonant converter with a resonant tank on primary side and its modes of operation. Such a circuit is shown in FIG. 5, and can be seen to comprise a full bridge inverter 53, a resonant tank 57 on the primary side, a monolithic transformer 54 and a medium voltage rectifier 55. Power flows in one direction only from Vg to Vo. When the two complementary transistor pairs (T1, T4 and T3, T2) are opened and closed alternately, a voltage square wave of defined frequency and duty cycle is applied to the resonant LC tank, while the diodes of the rectifier 55 are in uncontrolled rectification. The inverter voltage square wave induces a resonant current I in the tank circuit, which when rectified and filtered by the rectifier 55 is fed into the medium voltage network (Vo). The magnitude and shape of the output current is determined by the ratio between the switching frequency of the converter and the resonant frequency of the tank (formed by the series inductor Ls and series capacitor Cr), and the voltage ratio (Vg/Vo'). This explanation is valid for all modes of operation for frequency control.

In FIG. 7 it is possible to see possible methods of operation for the series resonant converter, and where this new method (Dual control, pulse removal) fills the gap. FIGS. 8A to 8F show the voltage waveform Vg generated by the inverter (solid lines) and the resulting LC tank current Ir (dashed lines) for the various methods of operation. Three modes of operation exist, depending on the ratio of tank resonant frequency and switching frequency: sub-resonant mode (see FIGS. 8A and 8B for voltage waveform and tank output current), resonant mode (see FIG. 8C for voltage waveform and tank output current) and super resonant mode (see FIG. 8D for voltage waveform and tank output current). In sub-resonant mode, the switching frequency is lower than the resonant tank frequency. It can be seen from FIGS. 8A and 8B that a complete current pulse is formed within one half of the voltage switching cycle, with room to spare. Resonant operating mode occur when the switching frequency is equal to that of the resonant tank, therefore switching occurs exactly at the zero crossing event of the current. It can be seen from FIG. 8C that each current pulse is exactly the same length as a half cycle of the voltage waveform. If the converter's switching frequency is higher than the resonant tank frequency then super resonant mode starts. It can be seen from FIG. 8D that current pulses are not wholly contained within half cycles of the voltage waveform. For every operation mode, two states of conduction can exist: continuous and discontinuous. Continuous conduction mode (CCM-FIG. 8B) appears when the resonant current rings continuously for the full switching period, while discontinuous conduction mode (DCM-FIG. 8A) has a zero current sub-interval. In that period, all of the rectifier diodes are reversed biased, until the inverter applied voltage changes sign.

For sub-resonant and super resonant mode three different control methods are possible and are shown in FIG. 7. By frequency control of input voltage, the effective resonant tank impedance varies with the switching frequency. The phase-shift method is controlling the applied voltage to the resonant tank by changing the duty cycle of the inverter (square wave) voltage, while having constant switching frequency. The duty cycle is varied by switching one transistor in a pair (say T1 and T4) off, resulting in a zero-voltage period. The third method, referred to as dual control, is achieved by combining the two previous methods to control transformer primary voltage and the switching current. Dual control in super resonant mode is known, while dual control in sub-resonant mode (in combination with the location of the resonant tank on the secondary side) forms the basis of the present technique.

The most favourable mode of operation and control method are selected based on available power semiconductors and application requirements. Considering the high power and medium voltage application in this case, 6.5 kV IGBTs will be employed on the primary side, while 6.5 kV line frequency rectifier diodes are used on the secondary side. Most of the available publications that use a resonant topology for other dc/dc converter applications are addressing low power and low voltage applications and are using MOSFETs with switching frequencies in the range of hundreds of kilohertz. For those kind of applications, super resonant mode is attractive, as it allows zero voltage switching (ZVS) at turn on. However, the main contributor to the overall losses with IGBT applications are the turn-OFF losses. The main reason is that these semiconductors are characterized by a bipolar power stage, that, in order to block HV, comprise a considerable large N-base region, which stores a large amount of charge during the conduction phase of the semiconductor. When the switch is turned off, this stored charge is evacuated from the semiconductor, causing tail currents that overlap with the blocking voltage, generating high switching losses. Therefore, a mode of operation that allows zero current switching or a small current at turn off should preferably be selected. This makes a sub-resonant mode preferable for IGBT applications.

Figure 8A:
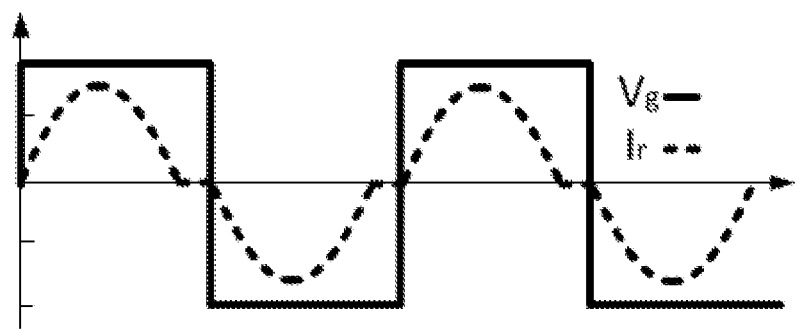
FIGS. 8A to 8F schematically illustrate a voltage applied to the transformer and a resonant current of the LC circuitry for various modes, including a sub-resonant discontinuous conduction mode (DCM) in FIG. 8A, a sub-resonant continuous conduction mode (CCM) in FIG. 8B, a resonant mode in FIG. 8C, a super resonant mode in FIG. 8D, a phase shift controlled mode in FIG. 8E and a dual control mode (combination of frequency and phase displacement) in FIG. 8F.
Figure 8B:
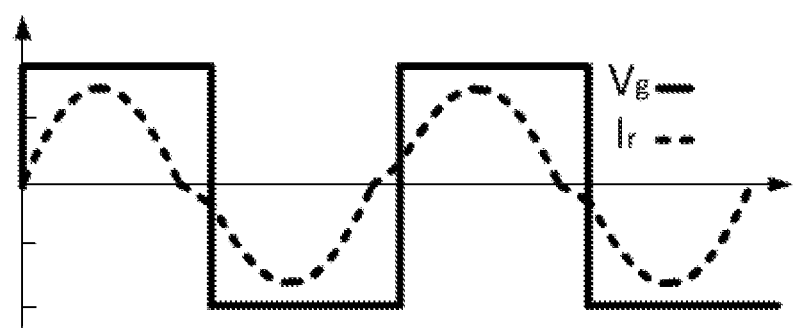
Figure 8C:
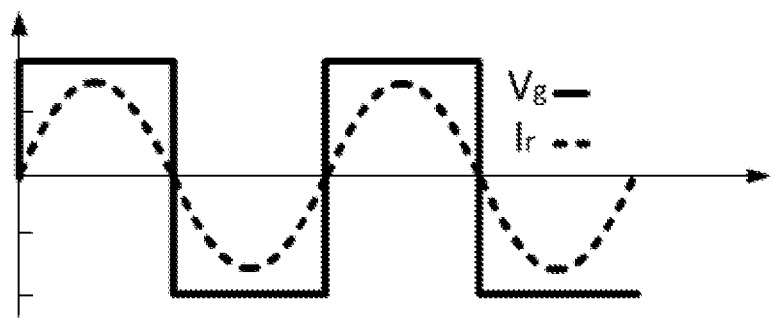
Figure 8D:
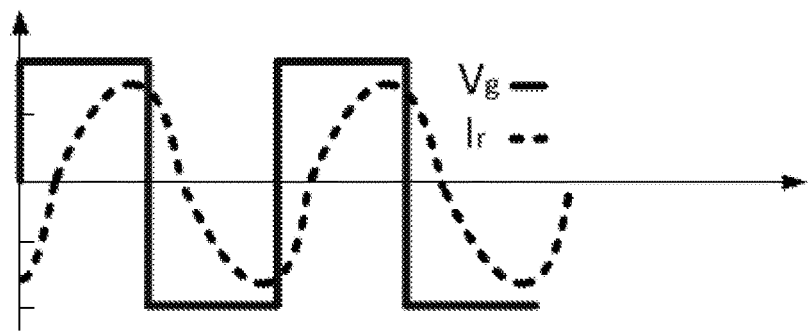
Figure 8E:
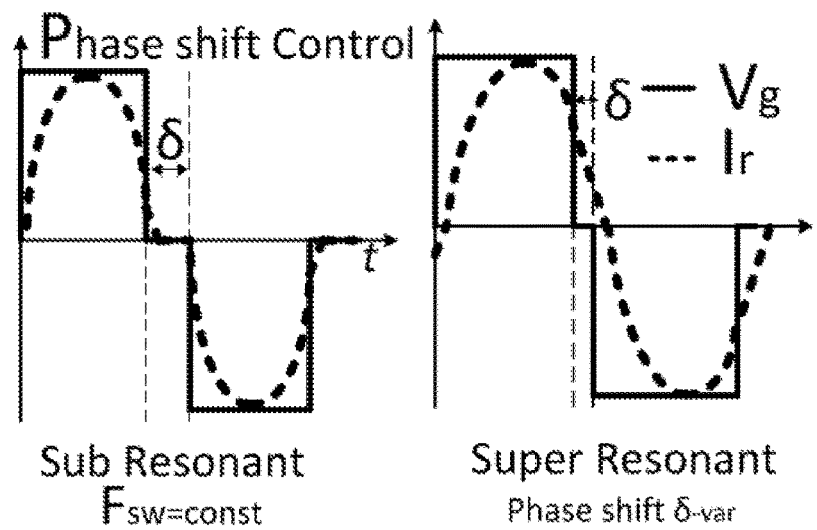
Figure 8F:
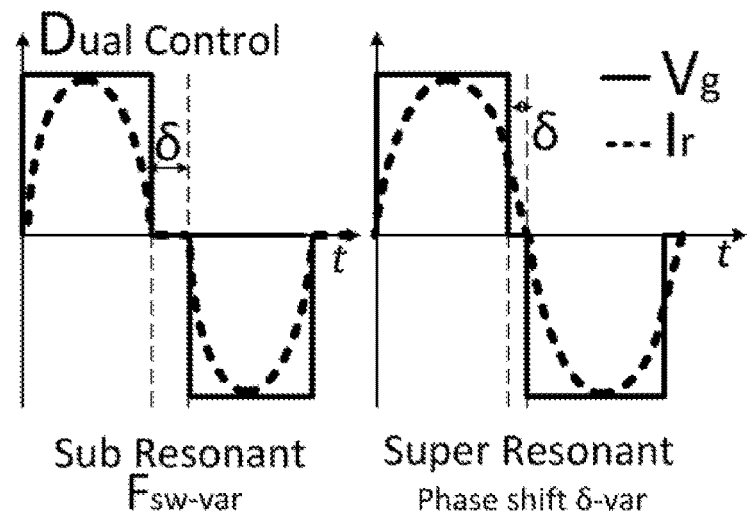
Figure 9:
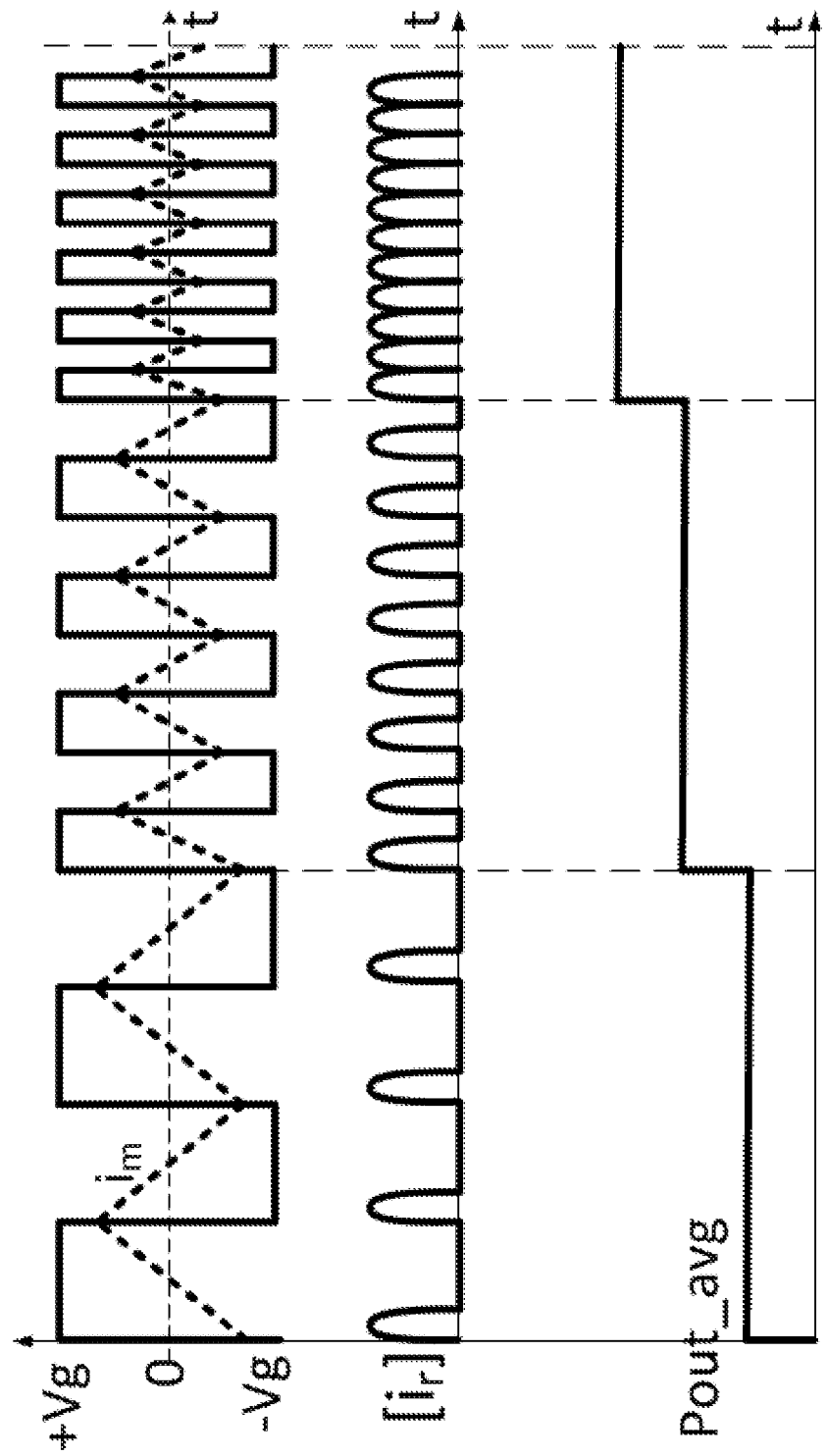
FIG. 9 schematically illustrates frequency control in a sub-resonant mode.

Once sub-resonant mode of operation is chosen, the control method needs to be selected from frequency control, phase shift control or dual control. The particular reason why sub-resonant operation seems to be attractive is that regardless of switching frequency, during every switching period a full resonant pulse is sent to the load. If the converter operates in DCM mode, intervals of zero current will appear. Operated below resonant frequency, it therefore allows the LV and MV side semiconductors to operate with zero current switching (ZCS) at turn off. With frequency control, output power becomes the product of the number of pulses per second and the energy transferred per pulse, as seen in line [$i_r$] and line Pout_avg of FIG. 9, which show the relationship between the number of pulses per unit time and the average power output. It is not the same situation with phase shift control, which controls the voltage duty cycle, meaning it will have to turn off the IGBTs at high current, as seen in FIG. 8E (which shows that in both sub-resonant mode (left hand side of FIG. 8E) and in super resonant mode (right hand side of FIG. 8E) the inverter voltage (Vg) is switched before a current pulse (Ir) has completed). So, phase-shift control for the series resonant converter will not allow soft-switching on the IGBTs. Accordingly, frequency control is initially selected as the control method for the series resonant converter. Operating the series resonant converter with the resonant tank on the primary side in sub-resonant mode and frequency control implies that the transformer and output filter need to be designed for the lowest switching frequency operating point. Transformer size increases with 1/f. This is a fundamental property and the principal drawback for an application that must operate continuously between 0% and 100% of nominal power. FIG. 9 (top part) shows how the amplitude of the magnetizing current Im (dashed line) varies with voltage switching frequency (solid line), being in a direct relation with applied volt-seconds. Below the lowest operational frequency, saturation will occur. A means of avoiding this should be implemented, otherwise, designing medium frequency transformers for a series resonant converter operated in a sub-resonant mode is not possible.

Figure 10:
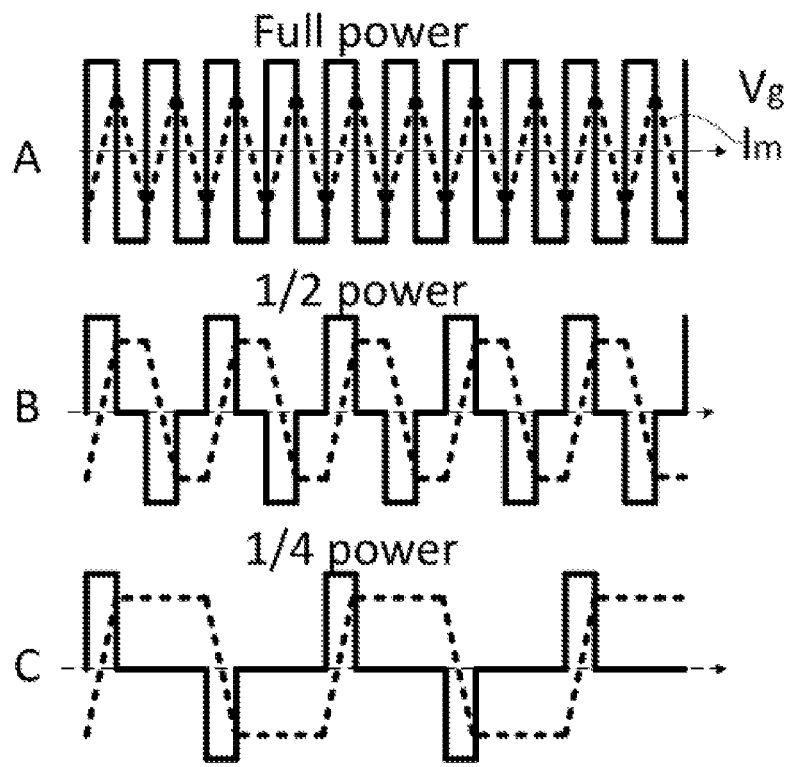
FIG. 10 schematically illustrates a pulse removal technique.
Figure 11:
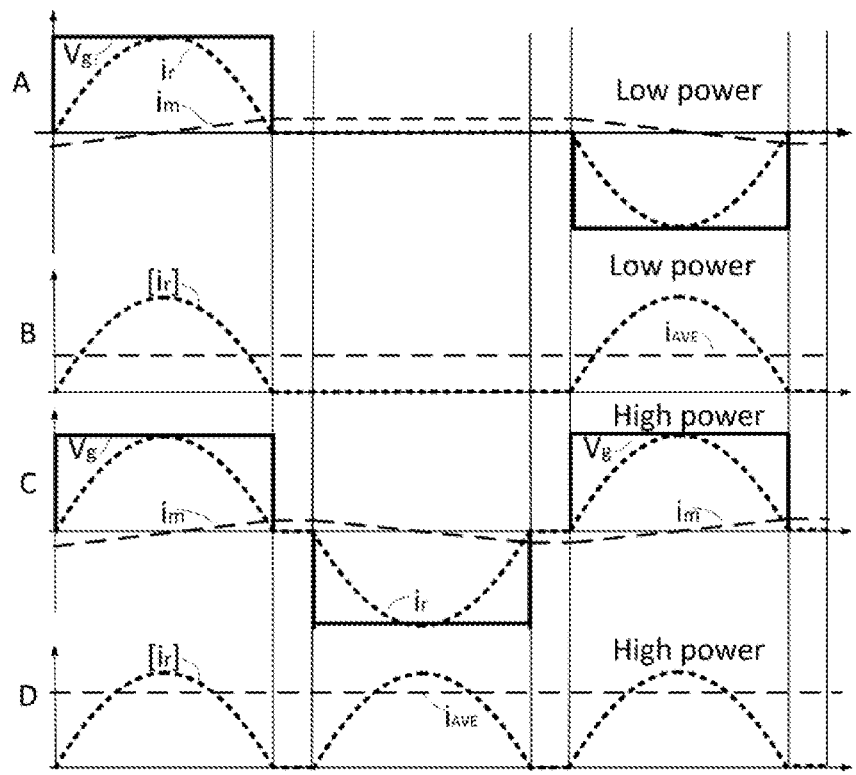
FIG. 11 schematically illustrates voltage and current waveforms for the technique of FIG. 10.

One method of designing the transformer for highest switching frequency and allow low frequency operation without saturation, is to apply a pulse removal technique as seen in FIG. 10. It can be noticed in FIG. 10, that if the applied voltage (solid line) has the same length as the resonant pulse, then the magnetizing current amplitude (dashed line) remains constant. In FIG. 10, graph A shows the series resonant converter operating at full power, with very short or zero length zero voltage periods and the maximum number of current pulses being provided per unit time. Graph B shows the series resonant converter operating at half power, with noticeable zero voltage periods, during which the transformer magnetising current remains stable. Graph B shows the series resonant converter operating at one quarter power, with zero voltage periods of greater duration than at half power. FIG. 11 shows resonant and magnetizing current on the series resonant converter, where a pulse removal technique is implemented with a combination of frequency and phase shift control, while running in sub resonant mode. In particular, graphs A and B of FIG. 11 relate to a lower power output (fewer current pulses) than graphs C and D of FIG. 11. Graph A shows a voltage output Vg (solid line) which matches the pulse duration of the resonant tank current $i_r$ (dotted line), with the transformer magnetising current $i_m$ being shown as a dashed line. Graph B shows the consequential rectified current [$i_r$], in which the polarity of the pulses are all the same, and in which a substantial zero current period is present between adjacent current pulses. The average current $i_{ave}$ is shown as a dashed line. Graph C shows a voltage output Vg (solid line) which (as with graph A) matches the pulse duration of the resonant tank current $i_r$ (dotted line), with the transformer magnetising current $i_m$ being shown as a dashed line. The zero voltage period is much shorter in graph C than in graph A, with adjacent resonant current pulses therefore being closer together. Graph D shows the consequential rectified current [$i_r$], in which the polarity of the pulses are all the same, and in which a relatively short (compared with graph B) zero current period is present between adjacent current pulses. The average current $i_{ave}$ is shown as a dashed line. The average current shown in graph D is greater than the average current shown in graph B, due to the greater number of current pulses. Returning to FIG. 8F, the use of dual (frequency and phase) control is shown both for a sub-resonant mode (left hand side of FIG. 8F) and super resonant mode (right hand side of FIG. 8F). It can be seen that, with dual control in the sub-resonant mode the voltage pulses Vg are of the same duration as the resonant current pulses Ir, whereas for dual control in the super-resonant mode the voltage pulse is of a shorter duration than the resonant current pulse.

Figure 12A:
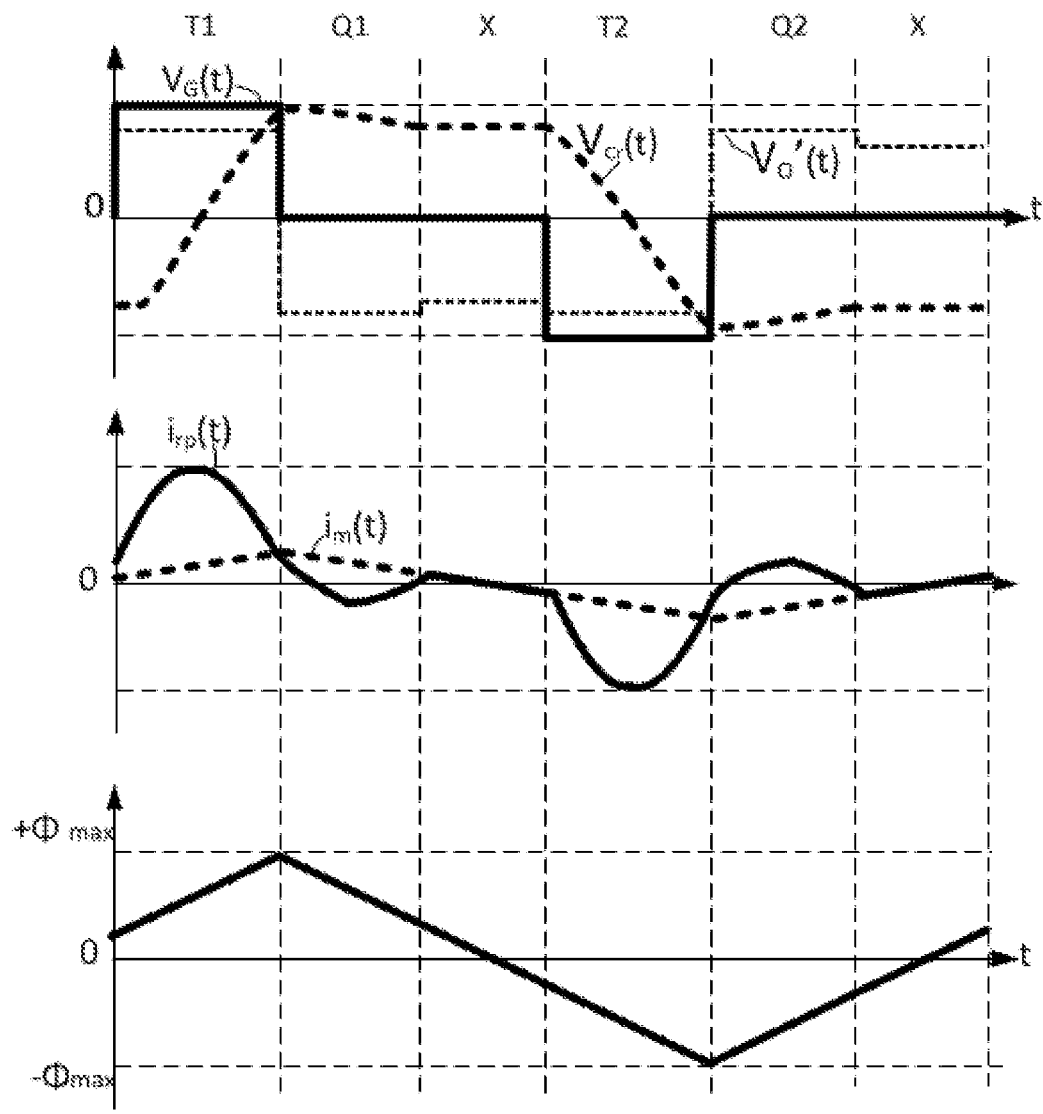
FIG. 12 schematically illustrates the effects of pulse removal both with a resonant tank on the primary side (A) and the resonant tank on the secondary side (B)
Figure 12B:
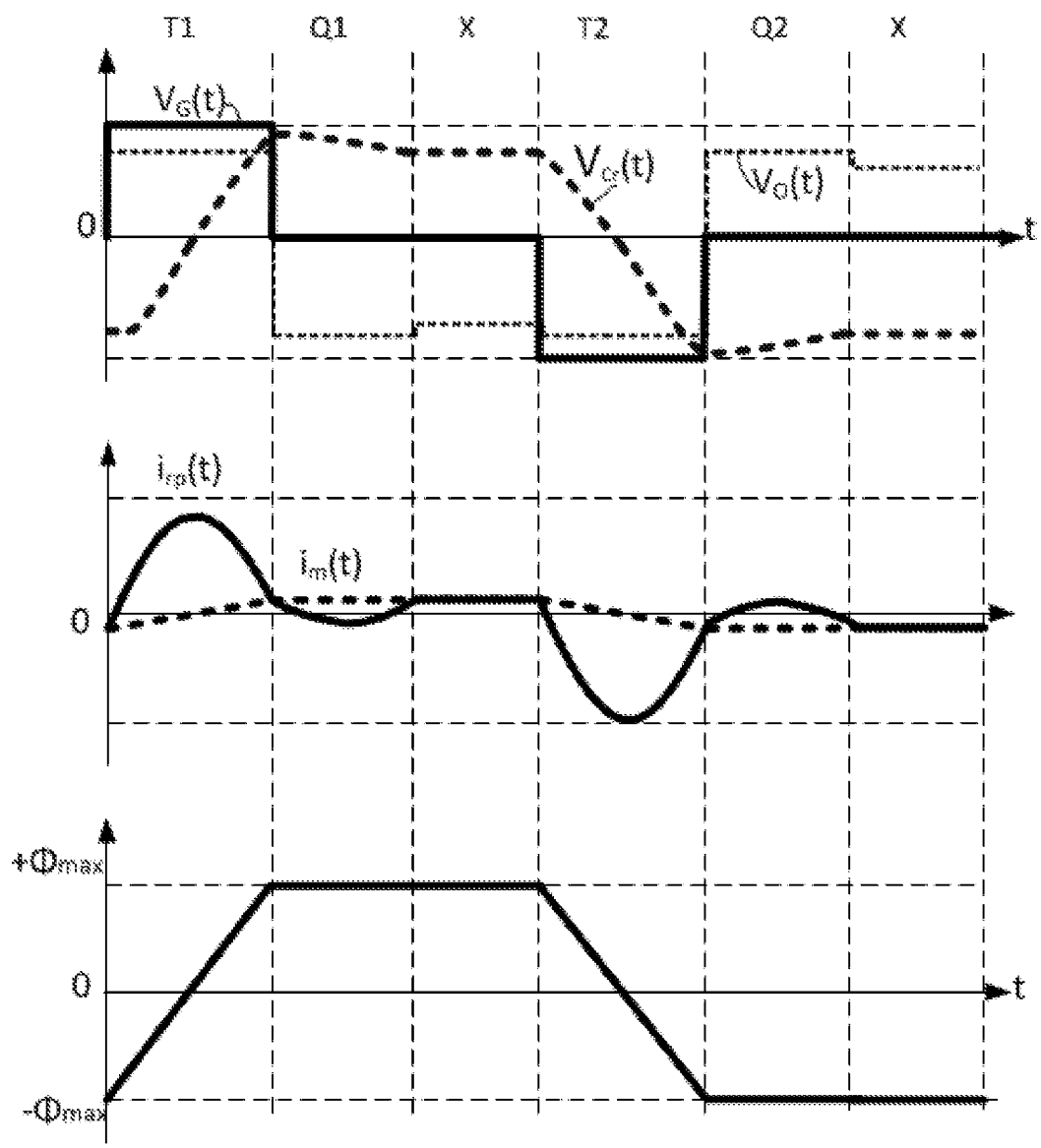

Applying the pulse removal technique is successful only if the resonant tank is placed on the secondary side of the transformer, as explained in the following. In FIG. 12A, the waveforms which result from having the resonant tank on the primary side are shown, while in FIG. 12B, the waveforms which result from having the resonant tank on the secondary side are shown. For each of FIGS. 12A and 12B, the top graph shows the tank input voltage Vg (solid line), the consequential voltage Vcr (dashed line) across the capacitor of the resonant tank, and a reflected output voltage Vo' (dotted line). The main goal is to achieve zero voltage on the transformer primary winding, as soon as the resonant current reaches zero, to stop further flux build-up. Looking at principle waveforms from FIG. 12A, it can be seen that even if Vg is set to zero, the transformer primary voltage Vo' reaches the same level as the resonant capacitor voltage Vcr in sub interval X, but with an opposite sign and the capacitor then discharges through an inductor Lm set in parallel with the primary transformer winding. On the other hand, moving the tank to the secondary side, for which see FIG. 12B, will mean that the transformer primary voltage will be controlled directly through Vg, thus limiting the volt-seconds and allowing for lower magnetizing flux. In particular, comparing the current waveforms of FIGS. 12A and 12B (middle graphs), it can be seen that, with the resonant tank on the primary side, when the voltage Vg is set to zero, the current through the inductor Lm immediately slows, and reverses direction during the zero voltage period (that is, before period T2 when the next voltage pulse is asserted). In contrast, with the resonant tank on the secondary side, the current through the inductor Lm remains stable until the next voltage pulse is asserted. The bottom graphs of FIGS. 12A and 12B shows the impact of this on magnetising flux. In particular, with the resonant tank on the primary side, the magnetic flux constantly changes, even during zero voltage periods, whereas with the resonant tank on the primary side, the magnetic flux is static during zero voltage periods.

Figure 13:
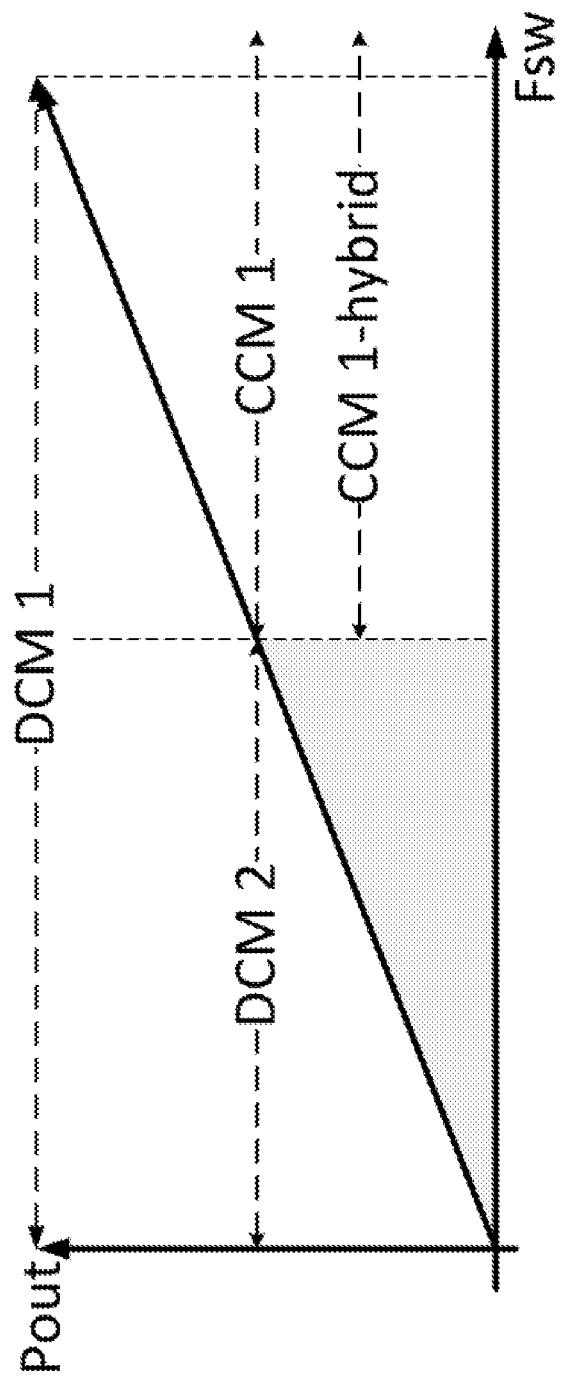
FIG. 13 schematically illustrates the relation between converter transferred power and switching frequency, indicating the possible operating modes for resonant tank on secondary side and of the present technique.
Figure 14:
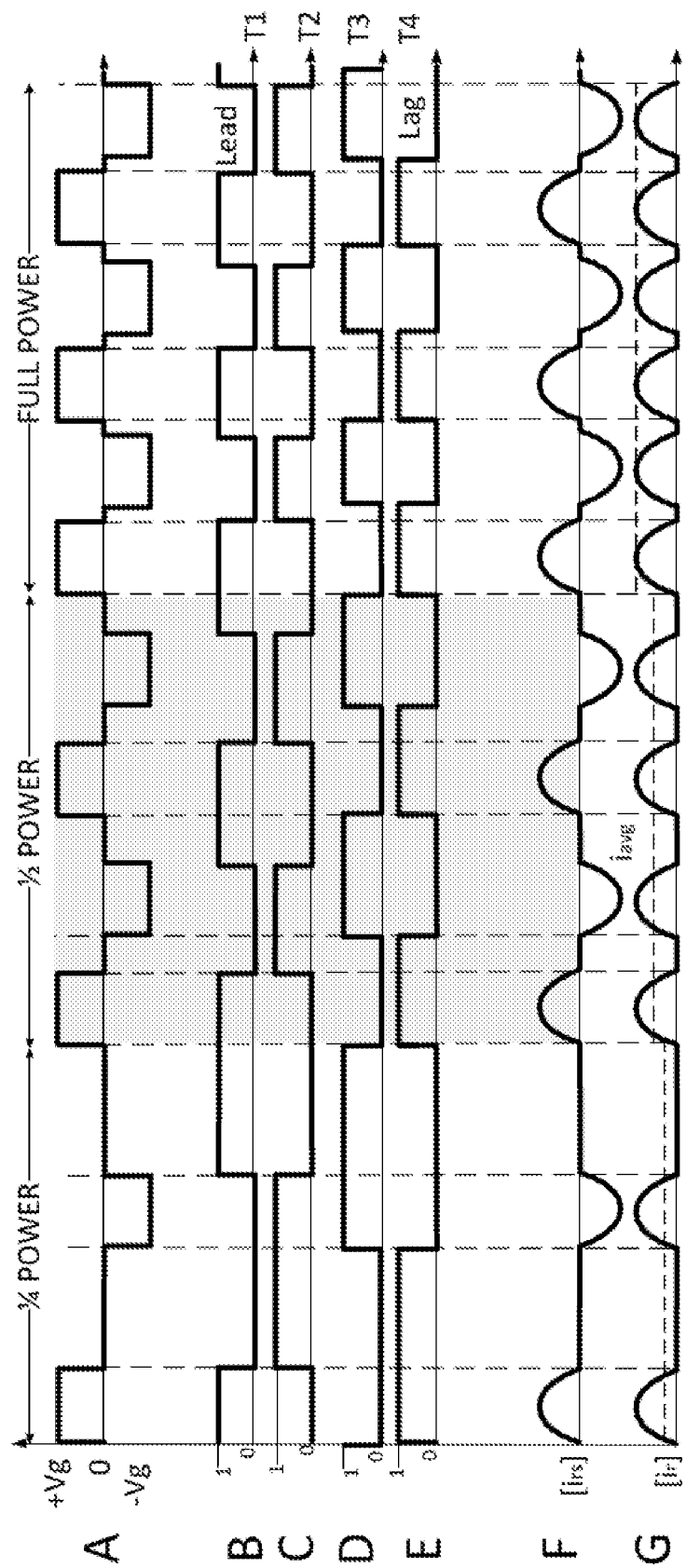
FIG. 14 schematically illustrates the relationship between switching frequency, phase shift, voltage pulses, resonant current and current out of rectifier of the present technique.
Figure 15:
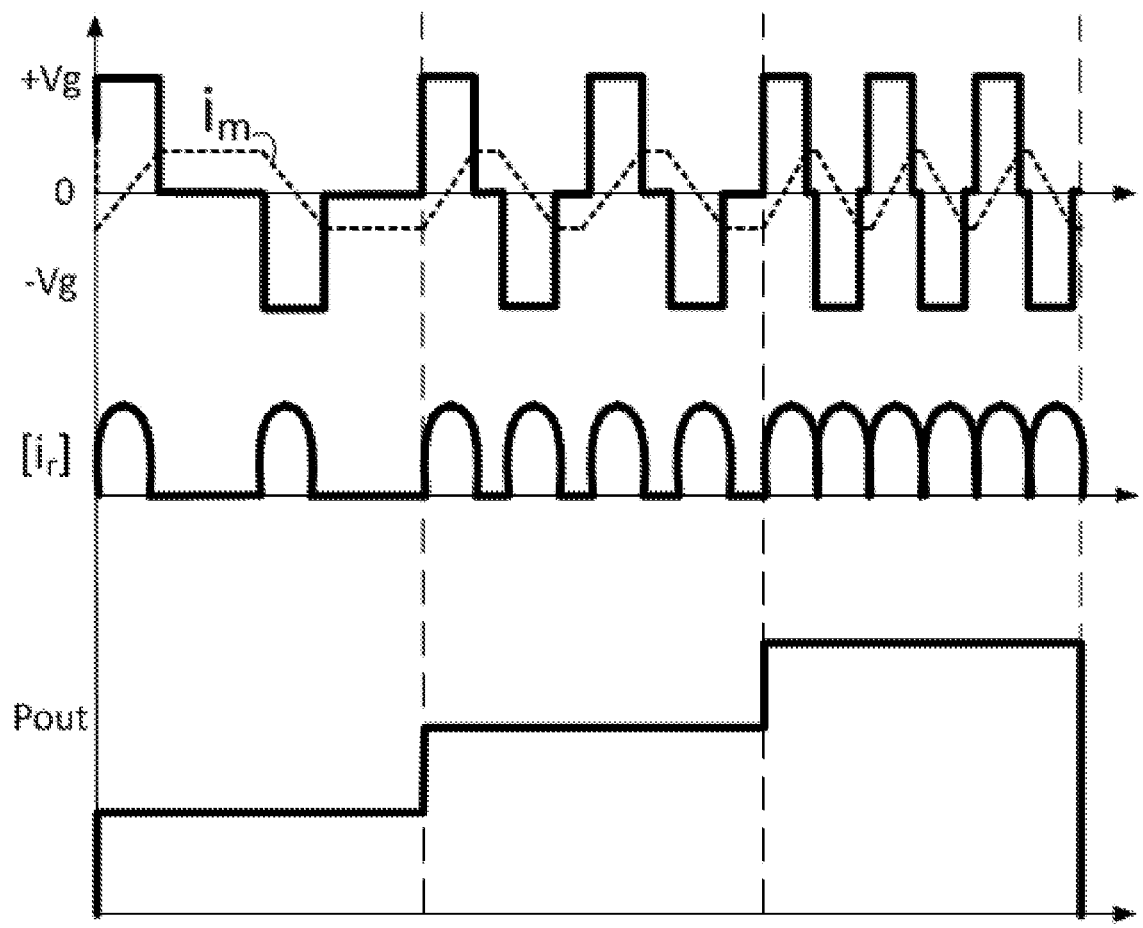
FIG. 15 schematically illustrates the relationship between pulse frequency and power for the present technique.

As explained above with reference to FIG. 6, the series resonant converter with the new method of operation (pulse removal technique) comprises a full bridge inverter 63, monolithic 1:N transformer 64, resonant tank 67 and medium voltage rectifier 65. Power flows from Vg (input voltage) to Vo (output voltage). The inverter 63 includes input capacitors Cf which assist with keeping the input voltage Vg at a consistent level. The inverter 63 also includes first switching circuitry comprising a transistor switch T1 in series with a transistor switch T2 between the positive and negative rails of the input voltage, the transistor T1 having a reverse biased diode D1 connected across it and the transistor T2 having a reverse biased diode D2 connected across it. The inverter 63 also includes second switching circuitry comprising a transistor switch T3 in series with a transistor switch T4 between the positive and negative rails of the input voltage, the transistor T3 having a reverse biased diode D3 connected across it and the transistor T4 having a reverse biased diode D4 connected across it. The first switching circuitry and the second switching circuitry are connected in parallel. The mid-points of the transistors T1 and T2 are connected to one end of the primary winding of the transformer 64. The mid-points of the transistors T3 and T4 are connected to the other end of the primary winding of the transformer 64. An inductor Lm is connected across (in parallel) with the primary winding of the transformer 64. The resonant tank 67 comprises an inductor Lr and a capacitor Cr connected in series at an input to the rectifier circuit 65. The resonant tank 67 is therefore a form of LC circuitry. The rectifier 65 comprises a set of diodes D5, D6, D7 and D8 which convert the AC-waveform received via the transformer 64 and the resonant tank 67 into a DC waveform, which is smoothed by the filter capacitors Cf and inductor Lf. The new method allows considerable reduction in size and weight of the transformer and offers flat efficiency versus load. The method of operation is an improvement to the classic variable frequency mode of operation. The switch pairs T1/T2 and T3/T4 operate at a 50% duty cycle. The converter leg consisting of switches T1/T2 (first switching circuitry) is referred to as the leading leg and the one consisting of switches T3/T4 (second switching circuitry) is referred to as the lagging leg. Commutation of switches on the leading leg is phase shifted with respect to the conduction of switches on the lagging leg, resulting in a quasi-square excitation voltage as seen in FIG. 14 (A) being applied to the primary winding of the transformer 64. The applied square wave voltage passes through the transformer 64 and excites the tank 67 and a resonant tank current I starts to flow. After rectification and filtering it is fed into the medium voltage network, Vo. Up to this point there is no operational difference compared with a constant frequency phase shift control, which is normally applied for operation in super resonant mode, to achieve ZVS at turn on. As IGBTs are employed, ZCS at turn off is necessary, so the series resonant converter operates in sub-resonant mode. The particular case for here is that the implemented phase shift has the same length as the resonant pulse (Tr/2), as seen in FIG. 14 (by comparison on the voltage waveform of A with the resonant current waveform of F). This means that as soon as the resonant current reaches zero, Vg is switched to zero, that is the "pulsed voltage is removed". Now, because the converter needs to control output power, just like in the case of frequency control of the classical series resonant converter, also here output power has a linear relation to the number of resonant pulses transferred per second, as depicted in FIG. 15 and FIG. 13.

FIG. 14 shows that regardless of output power, the applied tank voltage has the same length (see A) and allows a full resonant cycle to pass (see F). Output averaged current $i_{avg}$, indicated by the dashed line, becomes a function of the number of resonant pulses per unit time (as seen in G). The switching pattern of the transistors T1, T2 T3, T4 of FIG. 6 which gives rise to the voltage waveform of A is shown in B, C, D and E. The phase delay between T1, T2 and T3, T4 becomes a function of switching period and resonant pulse length.

As a result, the excitation voltage Vg, becomes a function of frequency and phase shift angle, with operation in sub-resonant mode. This means the zero voltage sub-interval has different lengths for different power levels. The major advantage of the present technique compared to a frequency control series resonant converter in sub-resonant mode, is that the transformer can be designed for the highest frequency and avoids saturation for lower frequencies.

Figure 16:
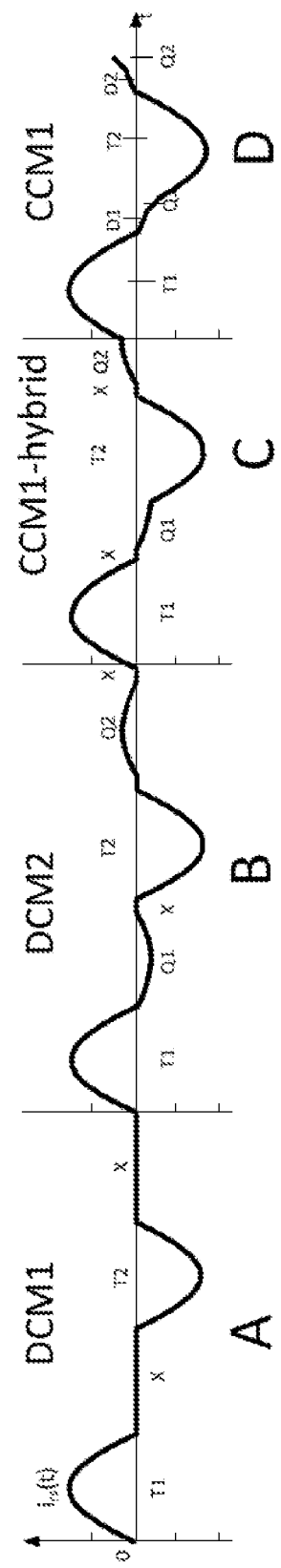
FIG. 16 schematically illustrates the resonant current through different modes of operation for the series resonant converter.
Figure 18A:
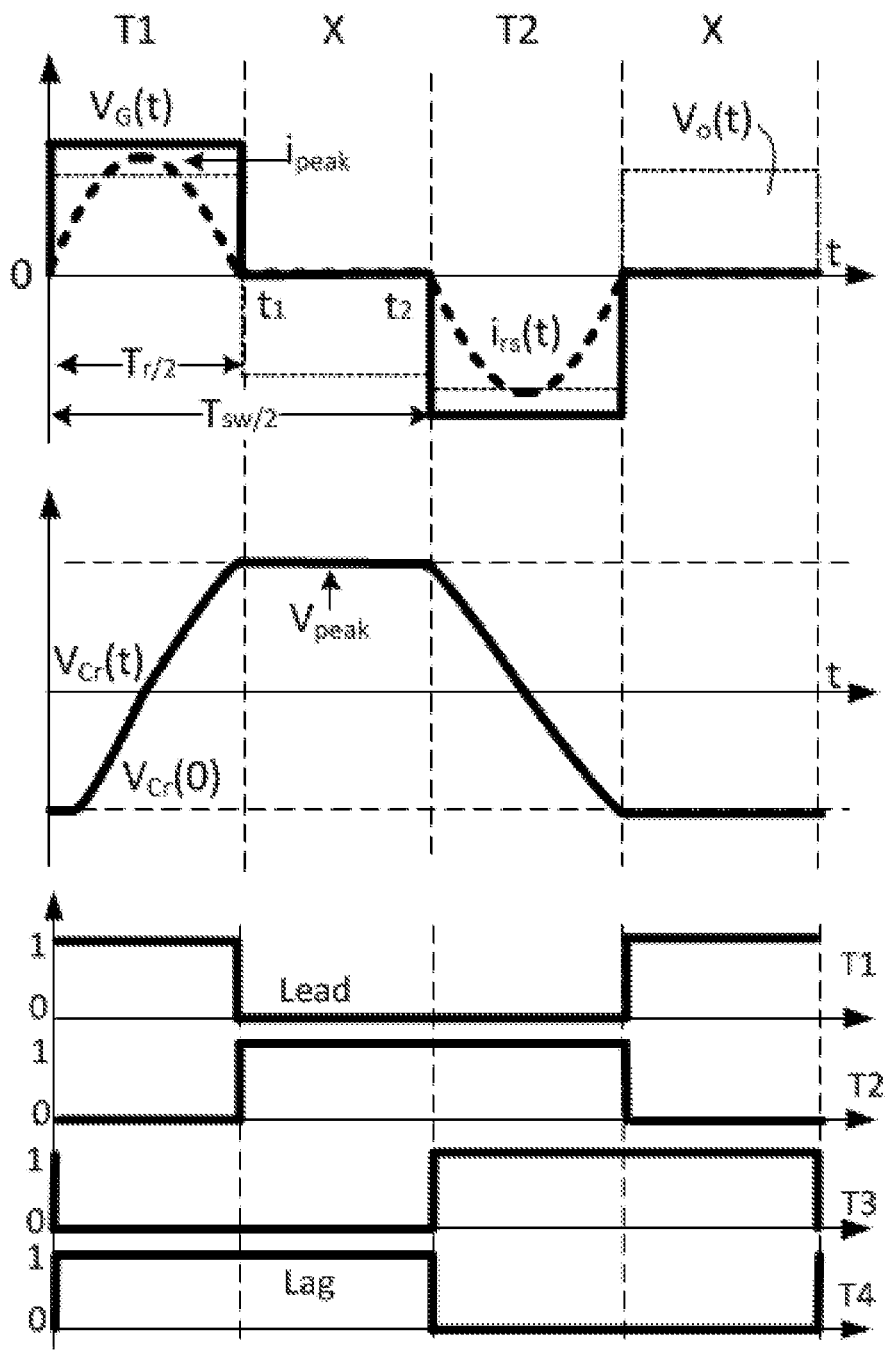
FIGS. 18A to 18D schematically illustrate ideal voltage and current waveforms for the four modes of operation, with FIG. 18A relating to mode DCM1, FIG. 18B relating to mode DCM2, FIG. 18C relating to mode CCM1-Hybrid and FIG. 18D relating to mode CCM1.
Figure 18B:
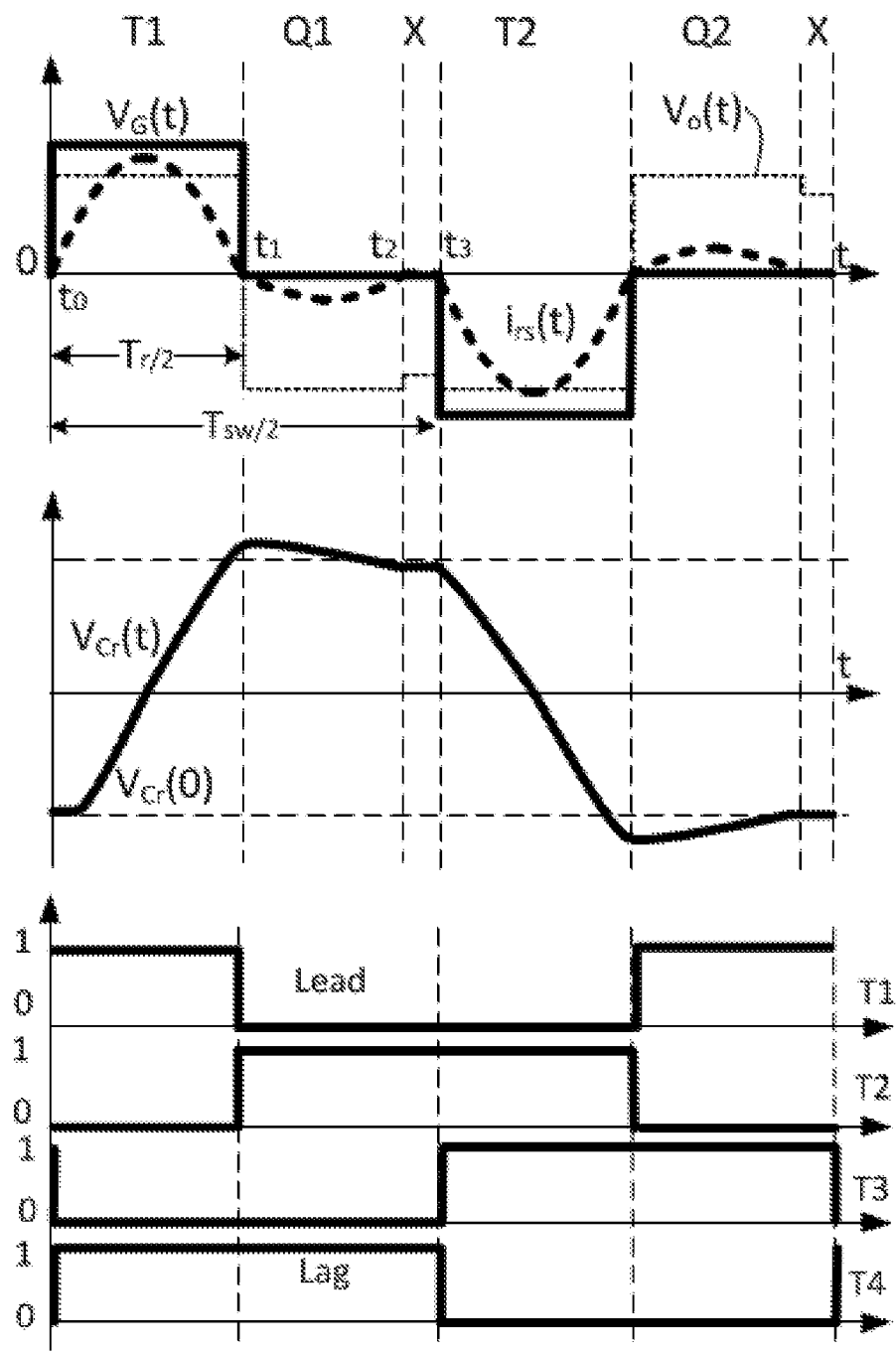
Figure 18C:
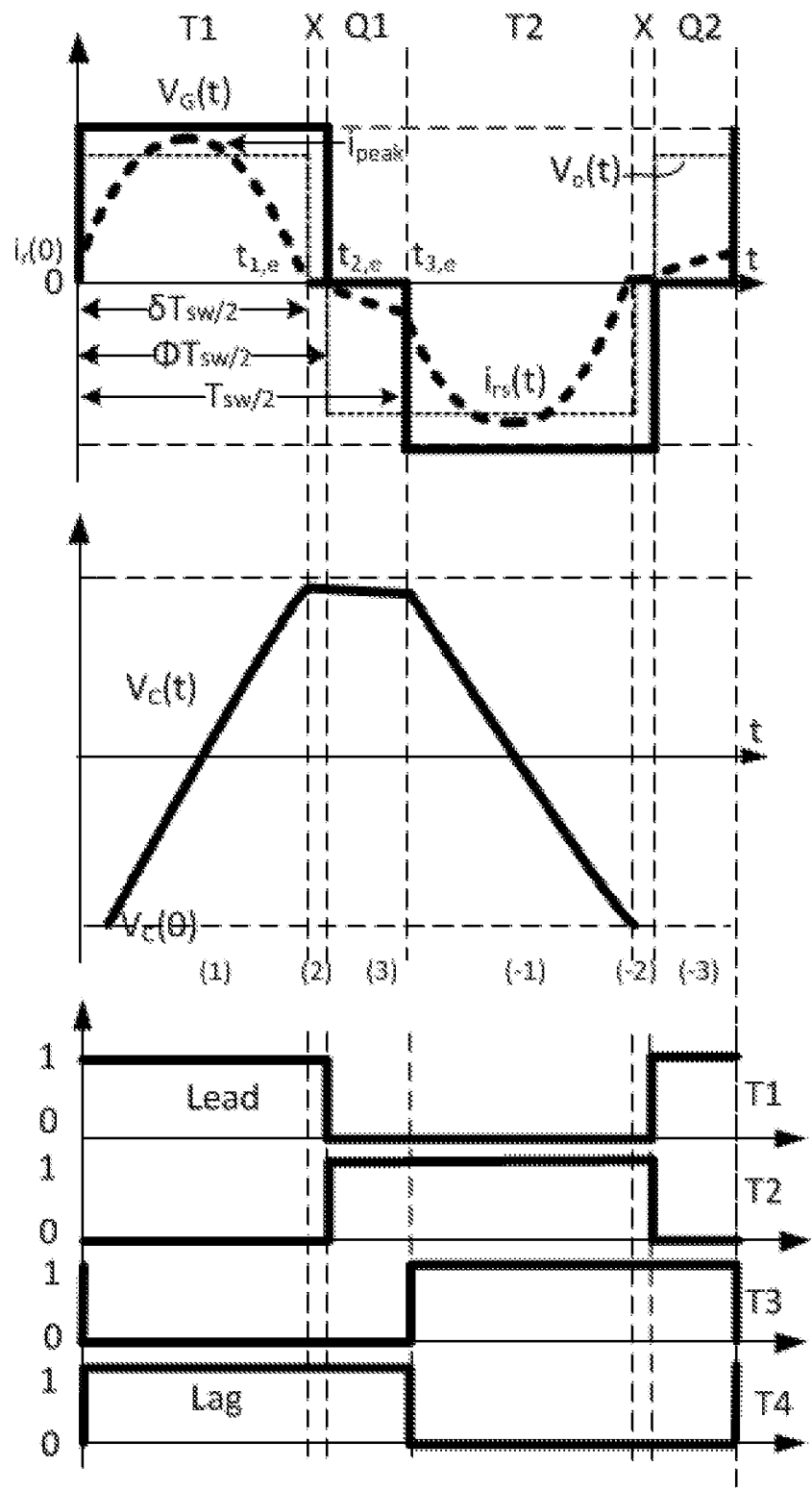
Figure 18D:
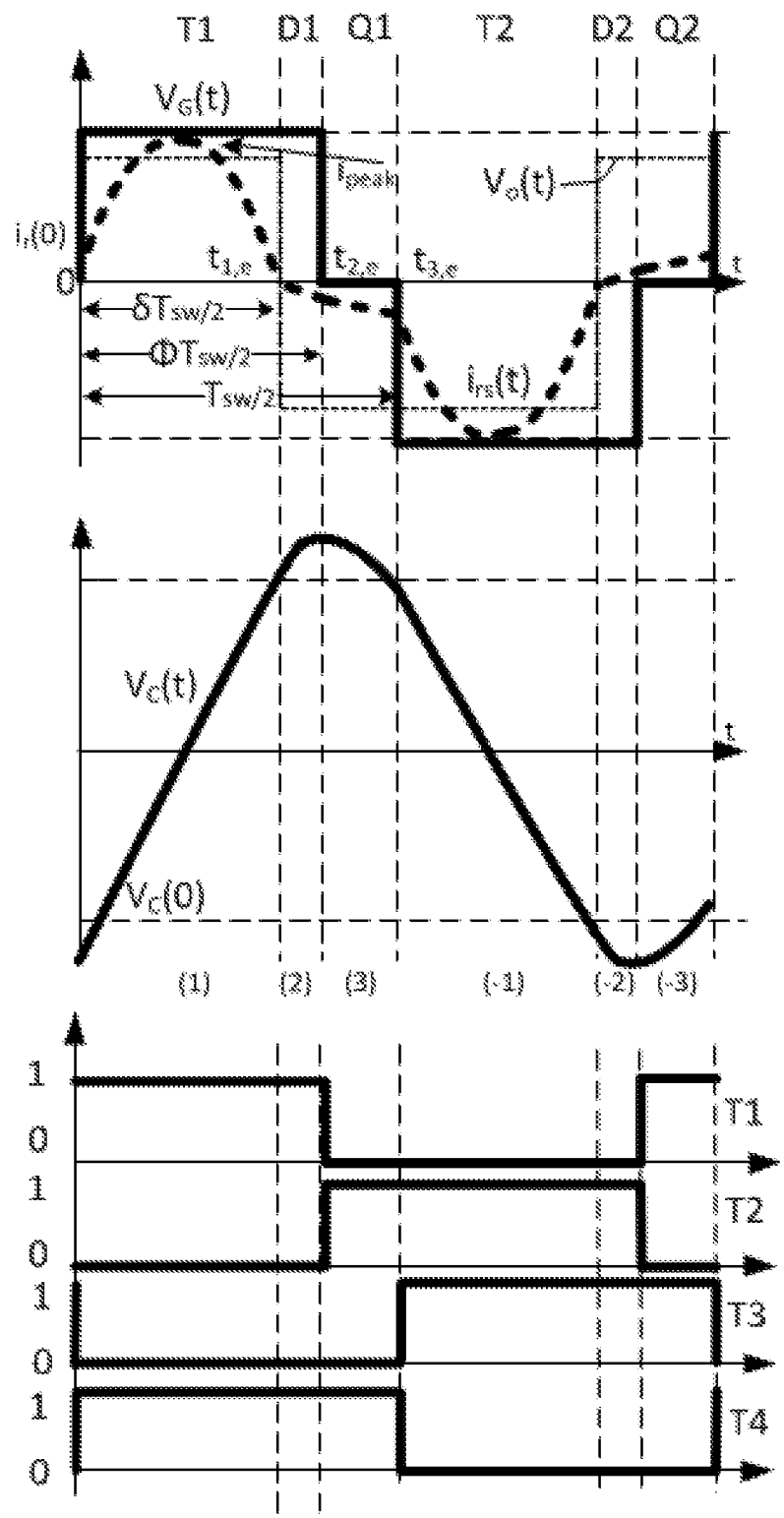

As in conventional series resonant converter operation in sub-resonant mode, the present technique will allow also a discontinuous (DCM) and continuous (CCM) conduction mode. Input power and voltage difference between primary reflected voltage Vg' (where Vg' equals Vg*N) and Vo will influence whether the converter operates in one conduction state or another. FIG. 16 shows the resonant current $i_{rs}$ through different modes of operation for the series resonant converter of FIG. 6, when voltage-driven as described above. It will be appreciated from FIG. 16 that the zero current period may be short in some conduction modes, or may merely be close to zero rather than zero. Each conduction state can have more than 1 resonant cycle, defined by mode index K, which is:

The number of full resonant cycles during a half switching period, for CCM mode. CCM1 as shown in FIG. 16D The number of half resonant cycles during a half switching period for DCM mode. DCM1 and DCM2 as shown in FIGS. 16A and 16B An extra mode of operation, CCM1-hybrid appears in the operation, as quasi zero sub-interval appears, as seen in FIG. 16C The converter should preferably operate as close as possible to DCM1 mode, to allow a linear relation between power and frequency. This is possible only if Vg'−Vo is approximately zero. In practice, the application does not allow this. Instead, the converter will go through different modes of operation. Under steady state, the switching below resonant frequency has 4 modes of operation as seen in FIG. 13: DCM1, DCM2, CCM1-hybrid and CCM1. Each mode is composed of a sequence of sub-intervals. FIGS. 18A and 18B show the ideal waveforms of a series resonant converter of FIG. 6 operated in DCM1 and DCM2 respectively. The upper graph of each of FIGS. 18A to 18D shows the applied voltage Vg (solid line), the resonant current $i_{rs}$ (dashed line) and the output voltage Vo (dotted line). The middle graph of each of FIGS. 18A to 18D shows the resulting voltage Vcr across the resonant capacitor. It will be seen that the voltage switching sequence and timing match up with the applied voltage Vg (that is, Vg pulses correspond to periods where both transistors of a switching pair are active). Further, the leading and lagging legs of the transistor switches are labelled. One resonant half cycle for DCM1 is composed of T1 and X subintervals, while for DCM2 an extra Q1 sub-interval is added. The resonant current becomes zero at the end of a half cycle until the beginning of next half cycle, where operation is similar but with reversed polarity. Two different CCM modes are shown in FIGS. 18C and 18D. CCM1-hybrid (FIG. 18C) is composed of a sequence of 7 sub intervals: T1, X, Q1, T2, X and Q2. CCM1 (FIG. 18D) is composed of the following sub-intervals: T1, D1, Q1, T2, D2 and Q2.

Transition from one mode of operation to another is determined by two parameters: switching frequency F and voltage difference between primary reflected voltage Vg' and rectifier output voltage Vo. DCM1 can appear in full operational range, regardless of switching frequency and only if Vg≈Vo. DCM2 is possible if Fs is ≥Fr/2. CCM1-hybrid starts when switching frequency Fs is larger than Fr/2, while Vg≈Vo. CCM1 appears also above Fr//2 and while Vg'>Vo.

The table set out in FIG. 17 summarises what determines which mode of operation that will apply in which circumstances.

Figure 19A:
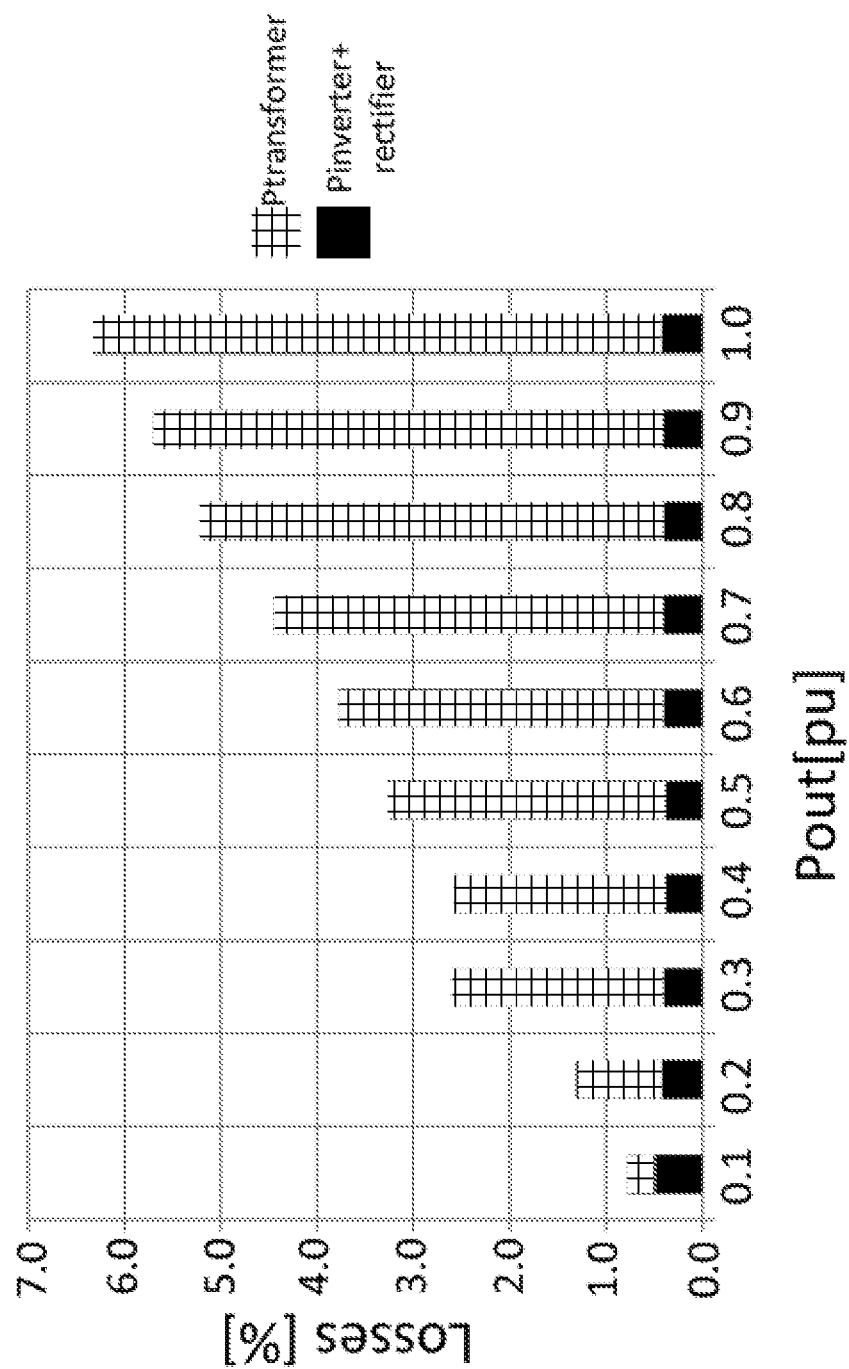
FIGS. 19A and 19B schematically illustrate the improved efficiency achievable using the present technique (FIG. 19B) compared with frequency control only (FIG. 19A), with appropriately designed semiconductors, transformer, LC circuitry.
Figure 19B:
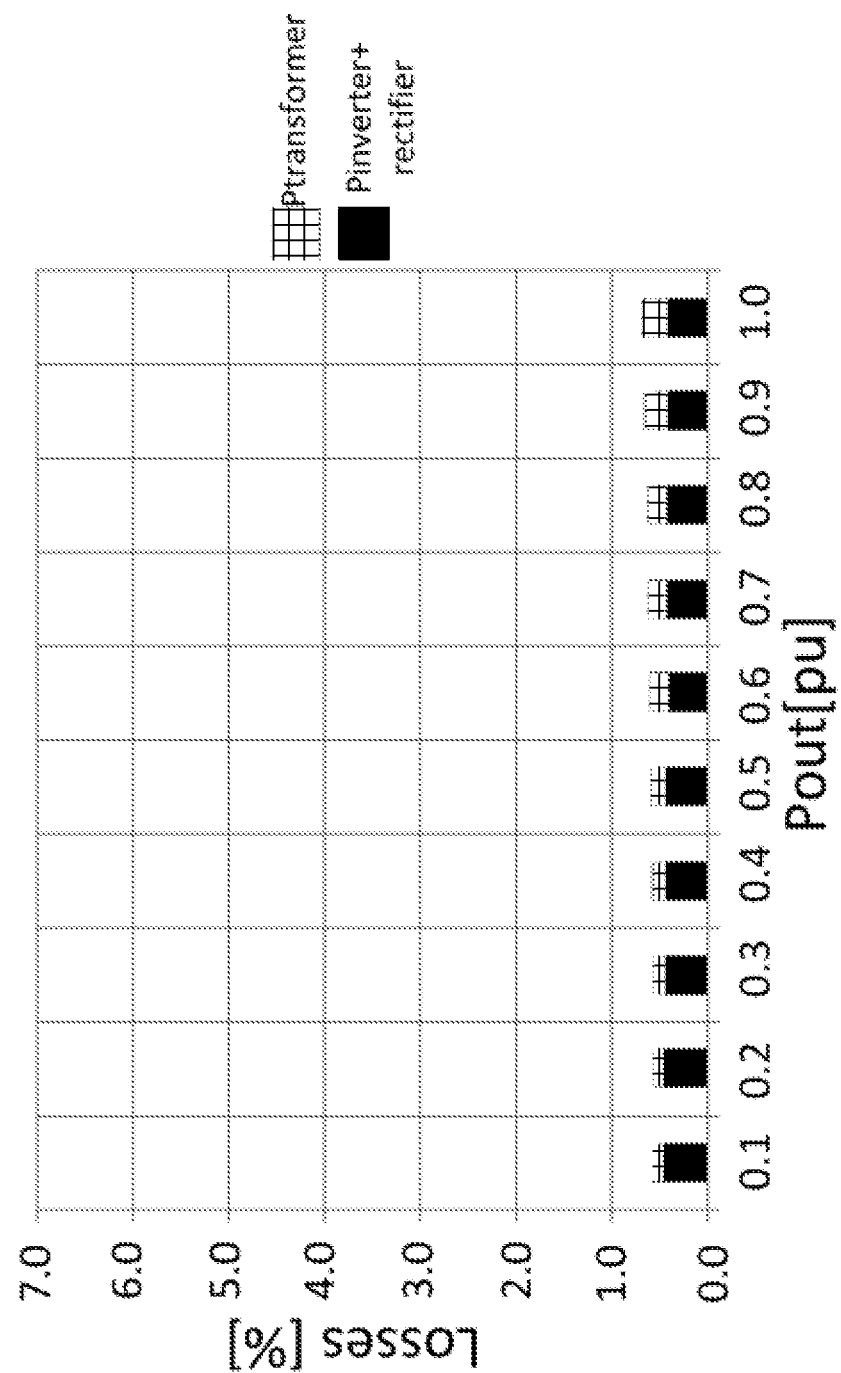

FIGS. 19A and 19B show that the present technique provides an improvement in efficiency compared with a variable frequency series resonant converter. In particular, transformer losses (core and windings) are much lower in the present technique due to the removal of the voltage pulse (zero voltage period), which would cause a build-up of magnetic flux in the transformer, leading to significant losses.

While the above description explains the invention with respect to a single phase converter, the present technique could also be applied to multiple phases. In particular, for a three-phase transformer, LC circuitry may be electrically connected to each secondary winding (on the secondary side of each phase), and the controller may control switching of the switching circuitry to apply voltage pulses to the primary windings of each phase in accordance with the description of a single phase (that is, with zero voltage periods, and voltage pulse lengths preferably of substantially the same length as a resonant current pulse length of the resonant tank on the secondary side). In this case though, the voltage pulses of each phase being would be displaced by 120° with respect to the voltage pulses of the other phases.

The invention claimed is:

1. A DC to DC power converter comprising: a transformer; a primary side comprising switching circuitry connected to a primary winding of the transformer; a secondary side connected to a secondary winding of the transformer, the secondary side comprising:
   inductor-capacitor (LC) circuitry at an input of the secondary side; and
   a plurality of diodes providing uncontrolled rectification; and
   a controller configured to:
   control switching of the switching circuitry to apply voltage pulses to the primary winding of the transformer, wherein the voltage pulses are separated by zero-voltage periods during which a zero or a near-zero voltage is applied to the transformer, wherein a switching frequency of the switching circuitry is less than the resonant frequency of the LC circuitry; and
   transition operation between different conduction modes based on (i) the switching frequency and (ii) a voltage difference between a primary reflected voltage and a rectifier output voltage, wherein the different conduction modes comprise:
   a first discontinuous conduction mode (DCM) when the voltage difference is substantially zero;
   a second DCM when the switching frequency is less than or equal to half of the resonant frequency;
   a first, hybrid continuous conduction mode (CCM) when (i) the switching frequency is greater than half the resonant frequency and (ii) the voltage difference is substantially zero; and
   a second CCM when (i) the switching frequency is greater than half the resonant frequency and the voltage difference is a positive value.

2. The DC to DC power converter according to claim 1, wherein a full resonant current cycle of the LC circuitry passes within a single switching cycle of the switching circuitry.

3. The DC to DC power converter according to claim 1, wherein a voltage is applied to the transformer by the switching circuitry for substantially a same duration as a resonant current pulse formed at the LC circuitry in response to the applied voltage.

4. The DC to DC power converter according to claim 3, wherein upon the resonant current through the LC circuitry reaching zero, the voltage output of the switching circuitry is switched to or near zero.

5. The DC to DC converter according to claim 1, wherein as the switching frequency increases, the length of the zero voltage periods is reduced.

6. The DC to DC converter according to claim 1, wherein a duration of the voltage pulses applied by the switching circuitry is independent of output power.

7. A DC to DC power conversion method of converting a voltage at a primary side into a voltage at a secondary side, the primary side comprising switching circuitry connected to a primary winding of a transformer of a power converter, the secondary side connected to a secondary winding of the transformer, the secondary side comprising inductor-capacitor (LC) circuitry at an input of the secondary side, the method comprising:
   controlling switching of the switching circuitry to apply voltage pulses to the primary winding of the transformer, wherein the voltage pulses are separated by zero-voltage periods during which a zero or a near-zero voltage is applied to the transformer, wherein a switching frequency of the switching circuitry is less than a resonant frequency of the LC circuitry, and
   transitioning operation between different conduction modes based on (i) the switching frequency and (ii) a voltage difference between a primary reflected voltage and a rectifier output voltage, wherein the different conduction modes comprise:
a first discontinuous conduction mode (DCM) when the voltage difference is substantially zero;
a second DCM when the switching frequency is less than or equal to half of the resonant frequency;
a first, hybrid continuous conduction mode (CCM) when (i) the switching frequency is greater than half the resonant frequency and (ii) the voltage difference is substantially zero; and
a second CCM when (i) the switching frequency is greater than half the resonant frequency and the voltage difference is a positive value.

8. A computer program product carrying a computer program which when executed on a data processing apparatus will perform an operation of DC to DC power conversion in which a voltage at a primary side is converted into a voltage at a secondary side, the primary side comprising switching circuitry connected to a primary winding of a transformer of a power converter, the secondary side connected to a secondary winding of the transformer, the secondary side comprising inductor-capacitor (LC) circuitry at an input of the secondary side, wherein the operation comprises:
controlling switching of the switching circuitry to apply voltage pulses to the primary winding of the transformer, wherein the voltage pulses are separated by zero-voltage periods during which a zero or a near-zero voltage is applied to the transformer, wherein a switching frequency of the switching circuitry is less than a resonant frequency of the LC circuitry, and
transitioning operation between different conduction modes based on (i) the switching frequency and (ii) a voltage difference between a primary reflected voltage and a rectifier output voltage, wherein the different conduction modes comprise:
a first discontinuous conduction mode (DCM) when the voltage difference is substantially zero;
a second DCM when the switching frequency is less than or equal to half of the resonant frequency;
a first, hybrid continuous conduction mode (CCM) when (i) the switching frequency is greater than half the resonant frequency and (ii) the voltage difference is substantially zero; and
a second CCM when (i) the switching frequency is greater than half the resonant frequency and the voltage difference is a positive value.

9. The method of claim 7, wherein a full resonant current cycle of the LC circuitry passes within a single switching cycle of the switching circuitry.

10. The method of claim 7, wherein each of the voltage pulses is applied to the transformer by the switching circuitry for substantially a same duration as a resonant current pulse formed at the LC circuitry in response to the applied voltage.

11. The method of claim 7, wherein as the switching frequency increases, the length of the zero voltage periods is reduced.

12. The method of claim 7, wherein a duration of the voltage pulses output by the switching circuitry is independent of output power.

13. The computer program product of claim 8, wherein a full resonant current cycle of the LC circuitry passes within a single switching cycle of the switching circuitry.

14. The computer program product of claim 8, wherein each of the voltage pulses is applied to the transformer by the switching circuitry for substantially a same duration as a resonant current pulse formed at the LC circuitry in response to the applied voltage.

15. The DC to DC power converter of claim 1,
wherein the switching circuitry comprises first switching circuitry and second switching circuitry,
wherein switching of the first switching circuitry is phase displaced with switching of the second switching circuitry by a phase shift having substantially a same period as a resonant frequency of the LC circuitry, and
wherein the controller is further configured to modify the switching frequency to control a voltage applied to the LC circuitry.

16. The DC to DC power converter according to claim 15, wherein the controller maintains the phase shift constant while modifying the switching frequency of the switching circuitry.

17. The DC to DC power converter according to claim 15, wherein the controller is operable to introduce zero voltage periods into a combined output of the first and second switching circuitry.

18. The DC to DC power converter according to claim 17, wherein each of the first and second switching circuitry comprises two switches in a voltage source converter, two-level, phase leg configuration, only one of the two switches being closed at any given time, an output voltage of a first polarity being output by the first and second switching circuitry when a first switch of the first switching circuitry and a second switch of the second switching circuitry, together forming a switching pair, are closed, and an output voltage of a second polarity being output by the first and second switching circuitry when a second switch of the first switching circuitry and a first switch of the second switching circuitry, together forming a switching pair, are closed, the zero voltage periods being provided at the output either by the first switch of the first and second switching circuitry or by the second switch of the first and second switching circuitry.

* * * * *